US010785005B2

(12) United States Patent
Lee et al.

(10) Patent No.: US 10,785,005 B2
(45) Date of Patent: *Sep. 22, 2020

(54) METHOD FOR DETERMINING POWER BOOSTING LEVEL OF PTRS FOR REMOVING PHASE NOISE IN WIRELESS COMMUNICATION SYSTEM AND DEVICE THEREFOR

(71) Applicant: LG ELECTRONICS INC., Seoul (KR)

(72) Inventors: Kilbom Lee, Seoul (KR); Hyunsoo Ko, Seoul (KR); Jiwon Kang, Seoul (KR); Kyuseok Kim, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/575,170

(22) Filed: Sep. 18, 2019

(65) Prior Publication Data
US 2020/0014513 A1    Jan. 9, 2020

Related U.S. Application Data

(63) Continuation of application No. 16/065,122, filed as application No. PCT/KR2017/012667 on Nov. 9, 2017, now Pat. No. 10,461,907.

(Continued)

(51) Int. Cl.
*H04L 5/00* (2006.01)
*H04W 72/08* (2009.01)
(Continued)

(52) U.S. Cl.
CPC .......... *H04L 5/0048* (2013.01); *H04L 1/00* (2013.01); *H04L 5/005* (2013.01); *H04L 5/0053* (2013.01);
(Continued)

(58) Field of Classification Search
CPC .. H04W 72/085; H04W 72/042; H04L 5/0048
See application file for complete search history.

(56) References Cited

U.S. PATENT DOCUMENTS 9,439,153 B1    9/2016 Vivanco et al.
10,461,907 B2 *  10/2019 Lee .......................... H04L 1/00
(Continued)

FOREIGN PATENT DOCUMENTS

JP      2016-519484      6/2016
KR    1020160123873    10/2016

OTHER PUBLICATIONS

Cisco, et al., "Verizon 5G TF; Air Interface Working Group; Verizon 5th Generation Radio Access; Physical channels and modulation (Release 1)", TS V5G.211 V1.3, Jun. 2016, 79 pages.

(Continued)

*Primary Examiner* — Jamal Javaid
(74) *Attorney, Agent, or Firm* — Lee Hong Degerman Kang Waimey

(57) ABSTRACT

According to an embodiment of the present specification, provided is a method for transmitting a signal that allows a user equipment to cancel phase noise by a base station in an mmWave communication system. In this case, the method may include: generating a PTRS for estimating phase noise of a downlink signal; transmitting PTRS power boosting level information for the PTRS to the user equipment via downlink signaling; and transmitting the PTRS via downlink signaling based on the PTRS power boosting level information. In this case, the PTRS power boosting level information may be determined based on at least one of MCS level and PRB size.

13 Claims, 22 Drawing Sheets

Related U.S. Application Data

(60) Provisional application No. 62/419,473, filed on Nov. 9, 2016, provisional application No. 62/444,296, filed on Jan. 9, 2017, provisional application No. 62/501,816, filed on May 5, 2017, provisional application No. 62/511,944, filed on May 26, 2017, provisional application No. 62/557,071, filed on Sep. 11, 2017.

(51) Int. Cl.
  *H04W 24/08* (2009.01)
  *H04L 1/00* (2006.01)
  *H04W 48/12* (2009.01)

(52) U.S. Cl.
  CPC ......... *H04W 24/08* (2013.01); *H04W 72/082* (2013.01); *H04W 48/12* (2013.01)

(56) References Cited

U.S. PATENT DOCUMENTS

| | | | |
|---|---|---|---|
| 2010/0103949 A1 | 4/2010 | Jung et al. | |
| 2015/0117428 A1* | 4/2015 | Lee, II | H04L 27/206 370/338 |
| 2015/0256312 A1 | 9/2015 | Yi et al. | |
| 2015/0318969 A1 | 11/2015 | Morioka | |
| 2016/0157246 A1* | 6/2016 | Suzuki | H04L 5/0048 370/329 |
| 2018/0351719 A1 | 12/2018 | Lee et al. | |

OTHER PUBLICATIONS

Cisco, et al., "Verizon 5G TF; Air Interface Working Group; Verizon 5th Generation Radio Access; Physical layer procedures (Release 1)", TS V5G.213 V1.4, Oct. 2016, 50 pages.

U.S. Appl. No. 16/065,122, Corrected Notice of Allowance dated Jul. 3, 2019, 5 pages.

U.S. Appl. No. 16/065,122, Office Action dated Feb. 20, 2019, 14 pages.

CSP Search Report at KIPO, dated Mar. 12, 2019, pp. 1-2 (Year: 2019).

LG Electronics, "Discussion on Phase Tracking RS for Multi-Antenna", 3GPP TSG RAN WG1 Meeting #87, R1-1611811, Nov. 2016, 6 pages.

NEC Group, "Downlink Reference Signal Enhancement for Low Cost MTC", 3GPP TSG RAN WG1 Meeting #73, R1-132334, May 2013, 6 pages.

PCT International Application No. PCT/KR2017/012667, Notification of Transmittal of The International Search Report and The Written Opinion of The International Searching Authority, or Declaration dated Mar. 6, 2018, 20 pages.

Ericsson, "Design considerations for phase noise tracking RS (PTRS)", 3GPP TSG RAN WG1 Meeting #87, R1-1612333, Nov. 2016, 5 pages.

NTT Docomo, "Views on RS for phase tracking", 3GPP TSG RAN WG1 Meeting #87, R1-1612720, Nov. 2016, 6 pages.

European Patent Office Application Serial No. 17870126.4, Search Report dated Jun. 12, 2020, 11 pages.

MediaTek Inc., "Synchronization Signal Design in CP-OFDM Based on Time-Frequency Hopping Patterns", R1-1609329, 3GPP TSG RAN WG1 Meeting #86b, Oct. 2016, 6 pages.

Japan Patent Office Application No. 2019-519726, Office Action dated Jun. 30, 2020, 3 pages.

Huawei, HiSilicon, "PTRS for CP-OFDM", R1-1712241, 3GPP TSG RAN WG1 Meeting #90, Aug. 2017, 9 pages.

LG Electronics, "On DL PT-RS design", R1-1713157, 3GPP TSG RAN WG1 Meeting #90, Aug. 2017, 5 pages.

LG Electronics, "Discussion on Phase Tracking RS for UL", R1-1700485, 3GPP TSG RAN WG1 NR ad-hoc, Jan. 2017, 7 pages.

* cited by examiner

FIG. 1
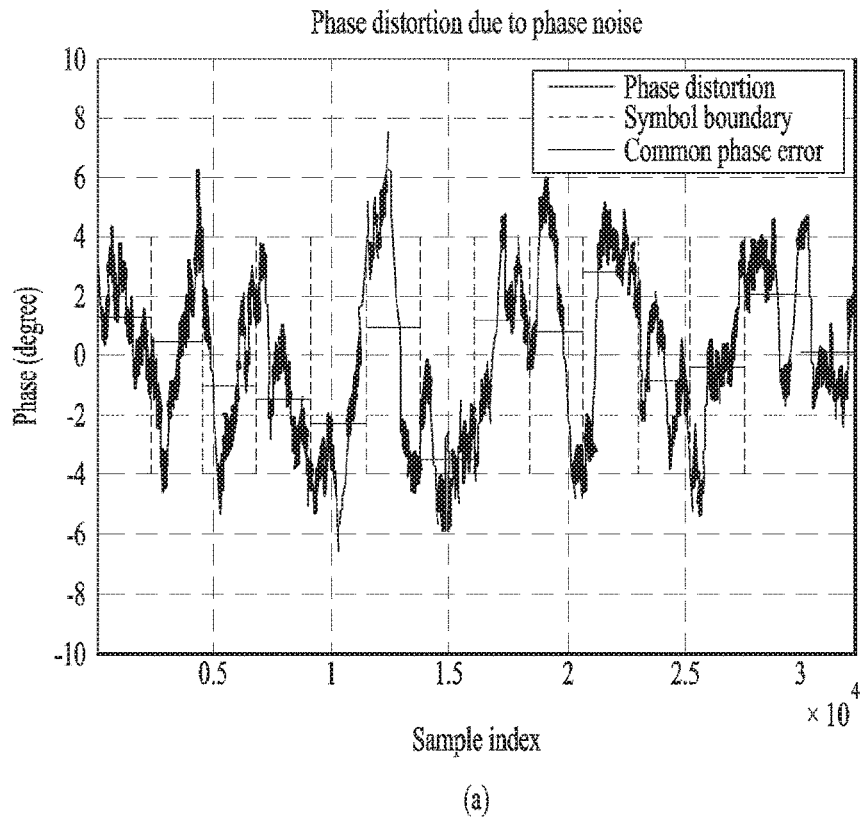
(a)
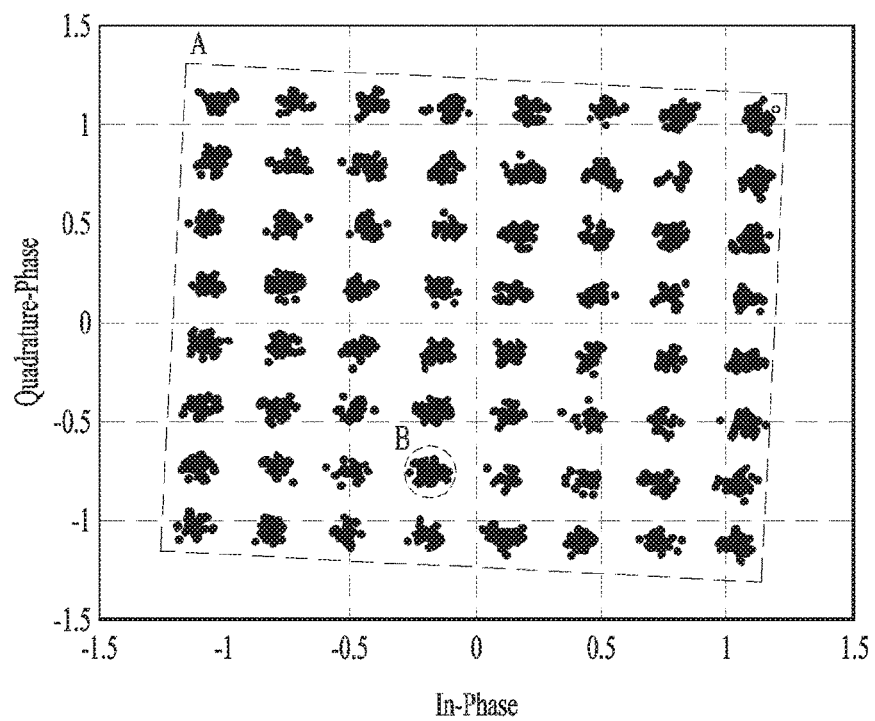
(b)

FIG. 2
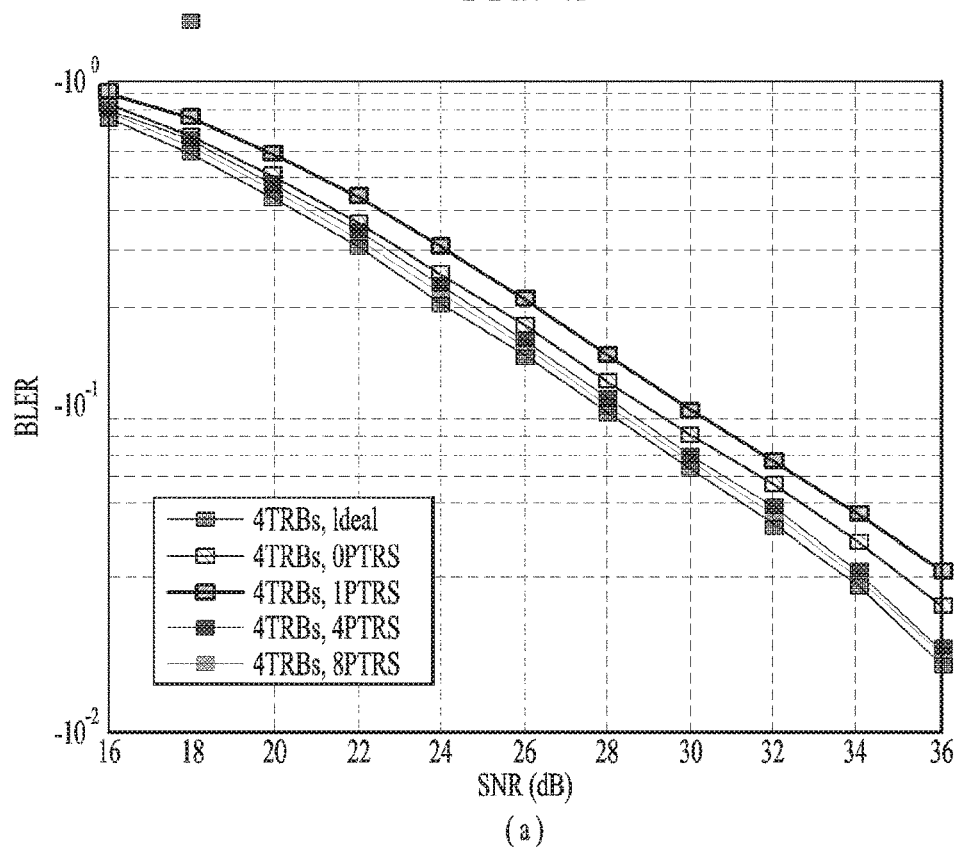
(a)
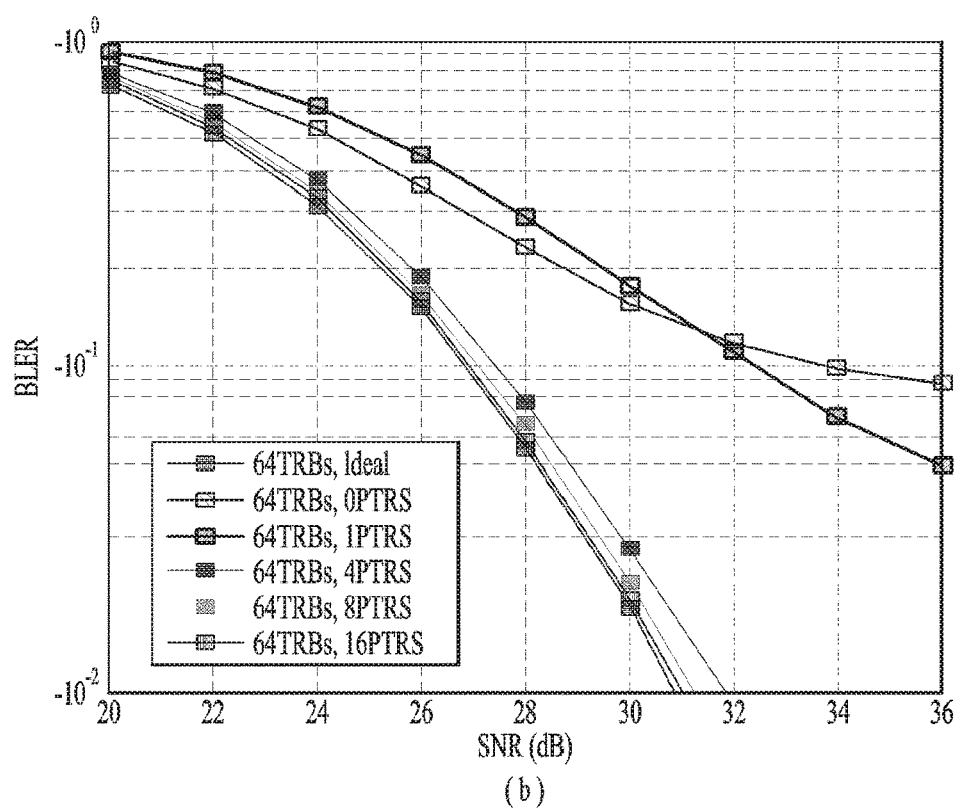
(b)

FIG. 8
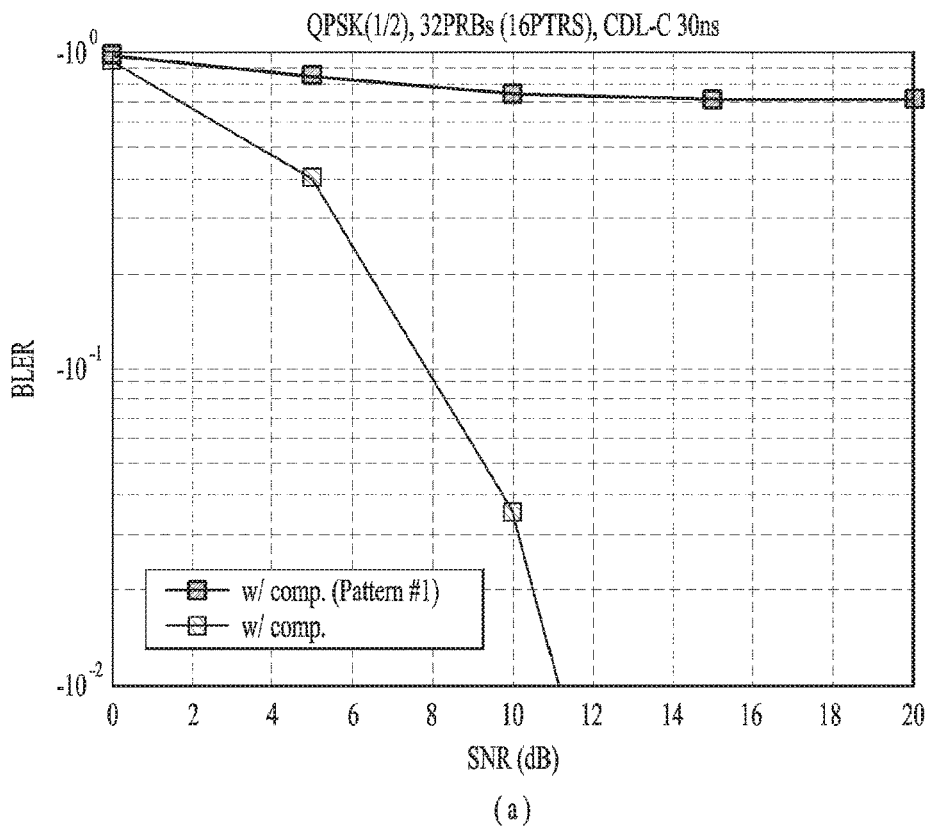
(a)
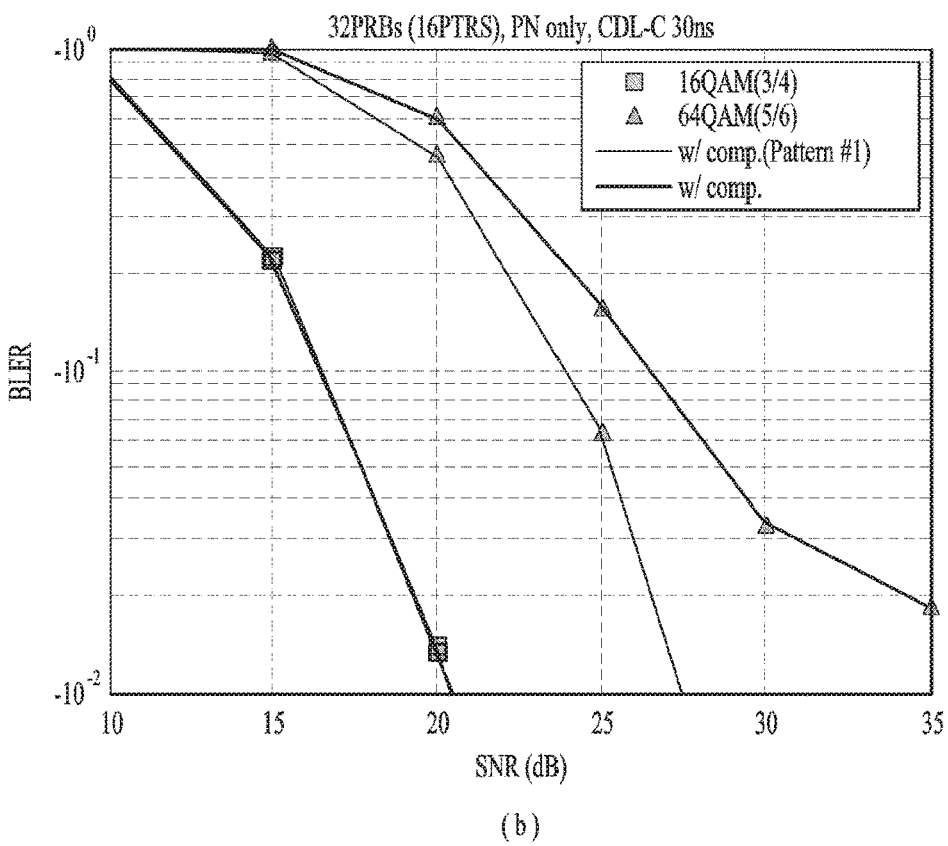
(b)

FIG. 10
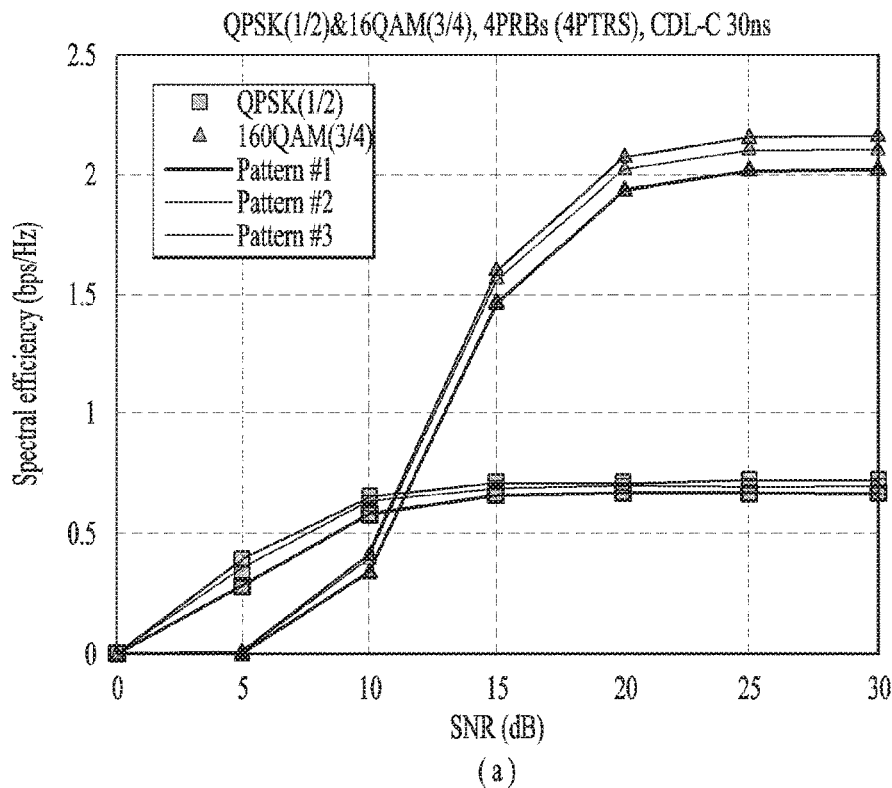
(a)
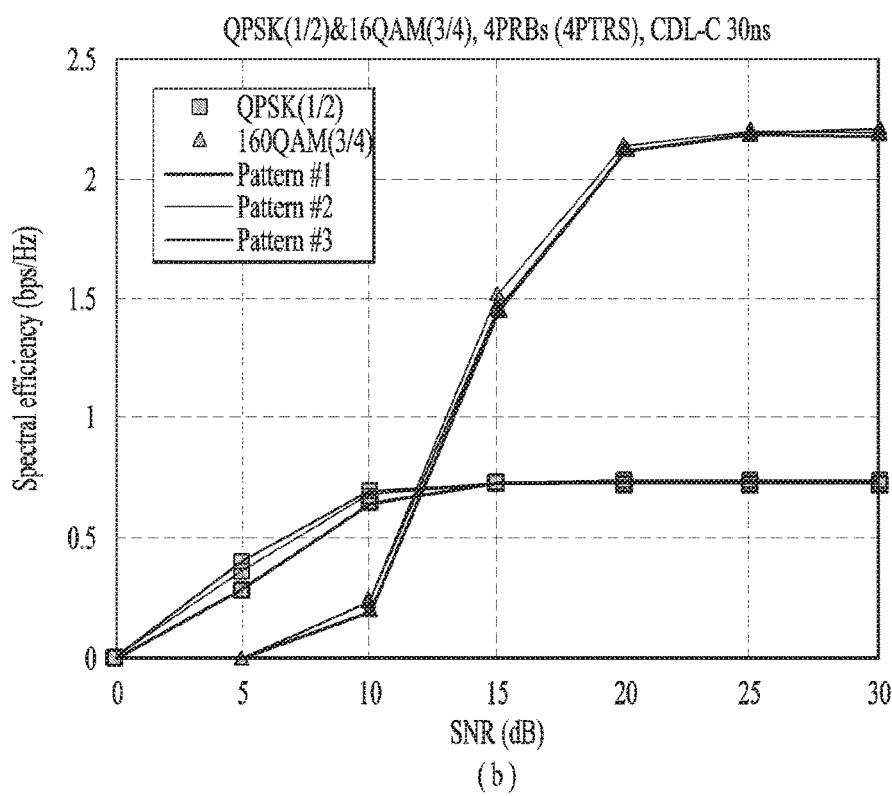
(b)

FIG. 11
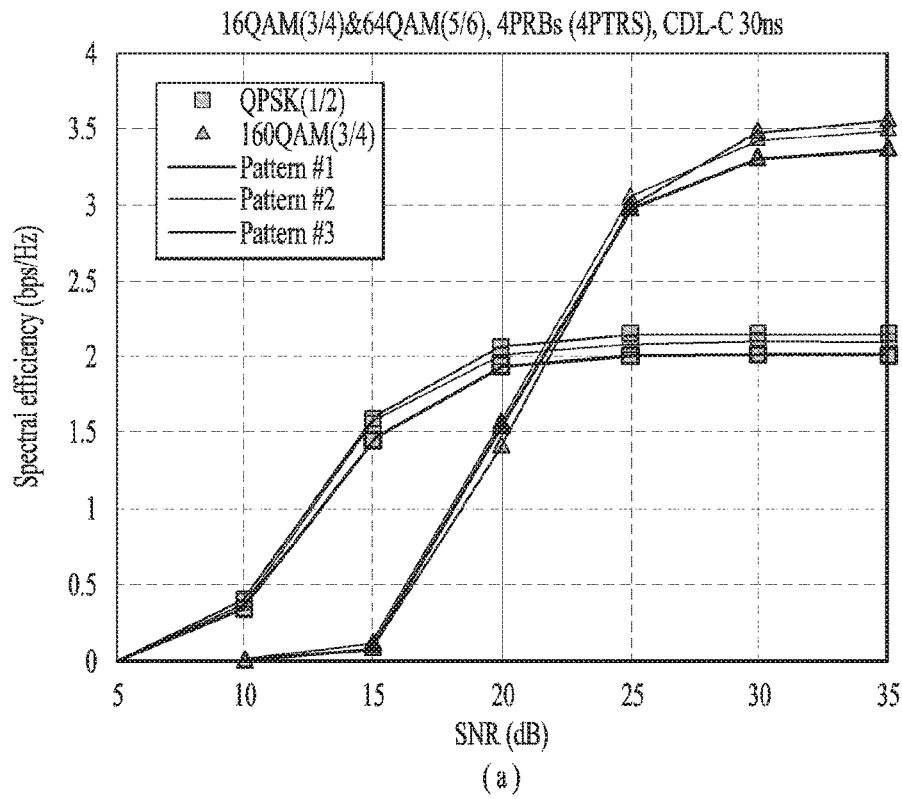
(a)
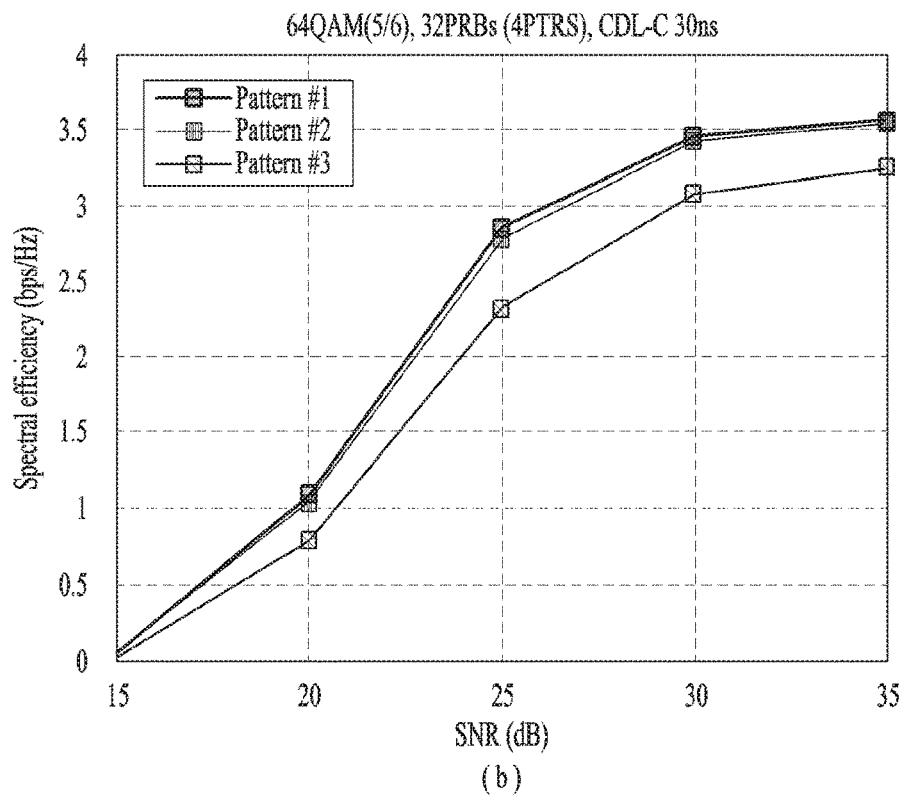
(b)

FIG. 12
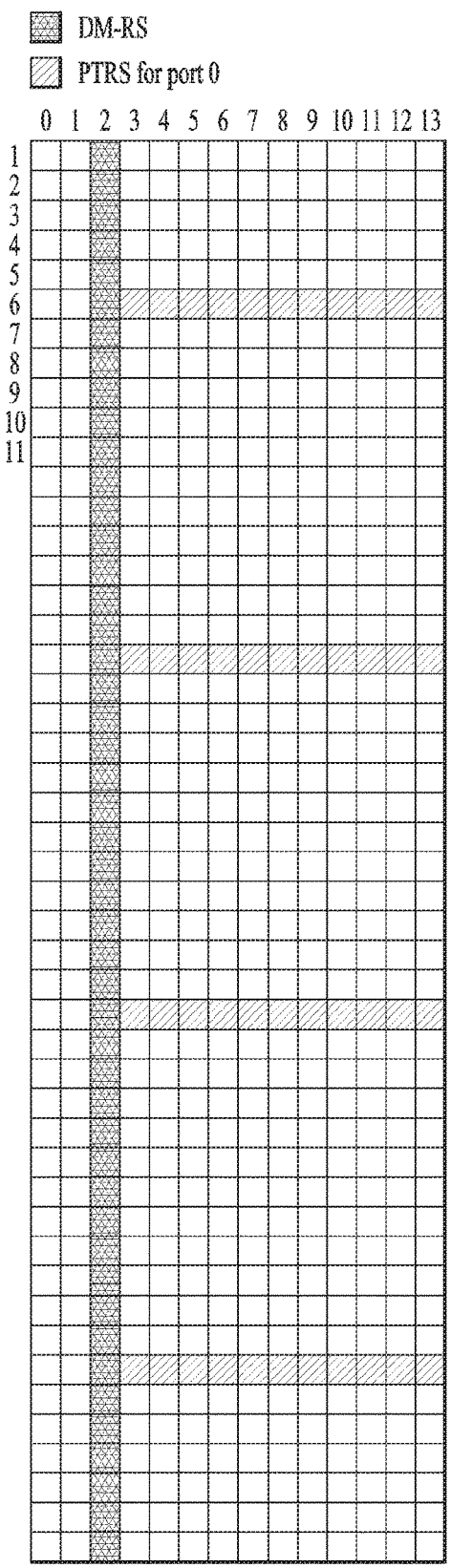
Distributed
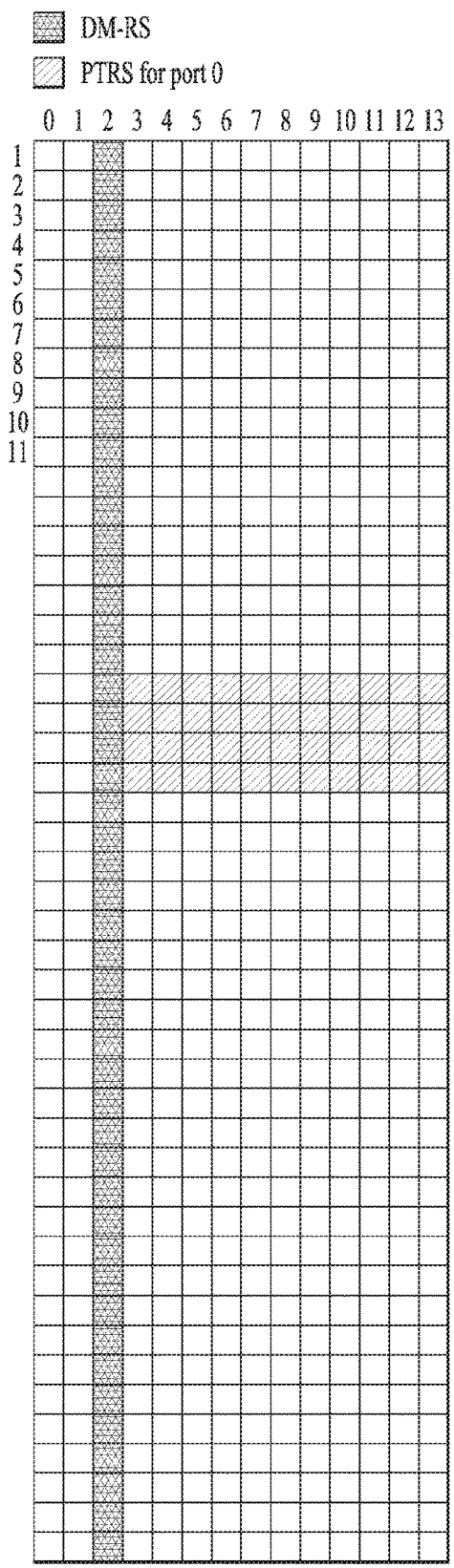
Localized

FIG. 18
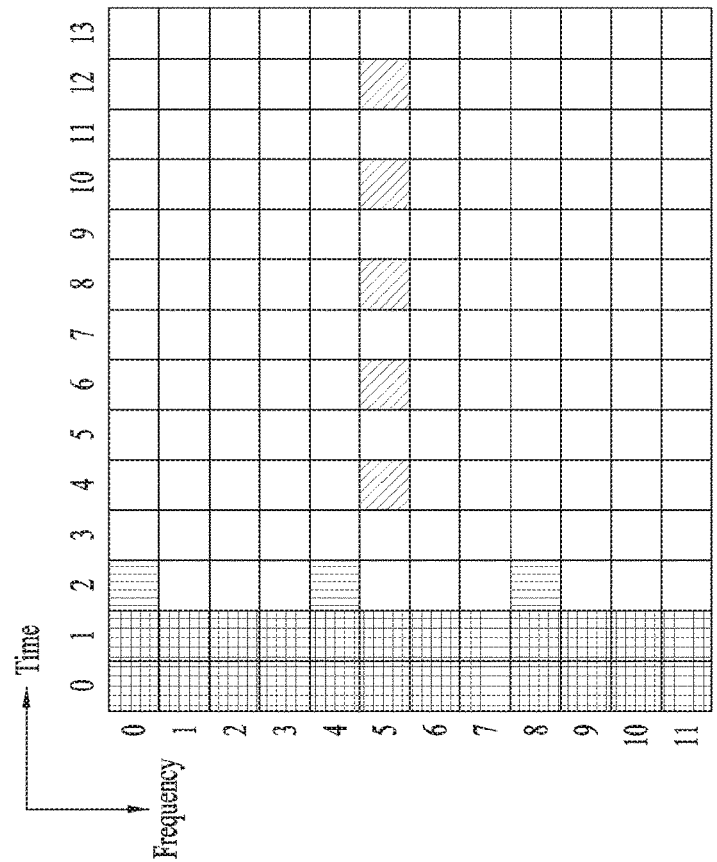
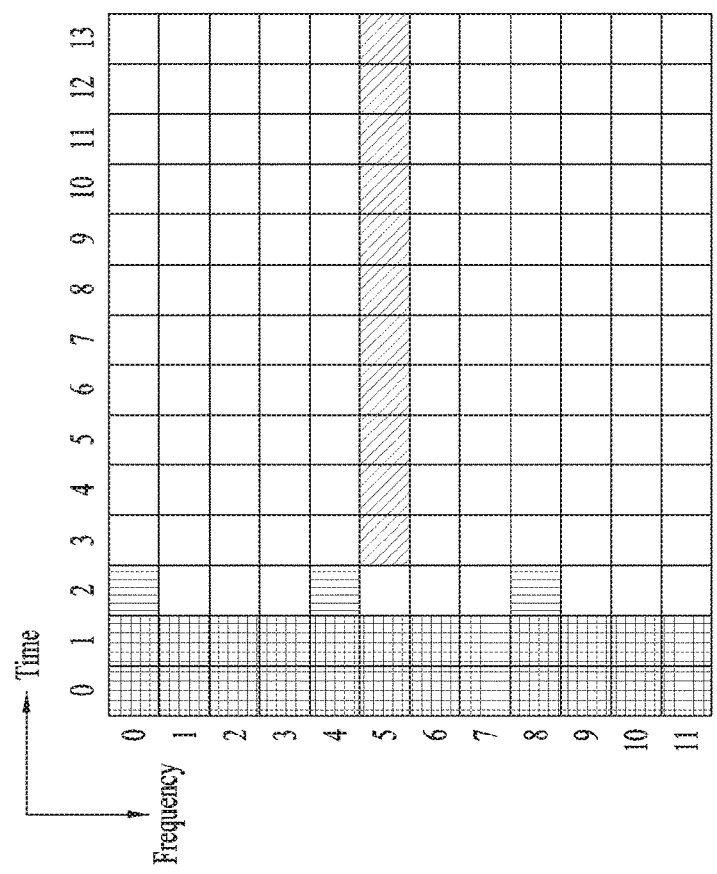

METHOD FOR DETERMINING POWER BOOSTING LEVEL OF PTRS FOR REMOVING PHASE NOISE IN WIRELESS COMMUNICATION SYSTEM AND DEVICE THEREFOR

CROSS-REFERENCE TO RELATED APPLICATIONS

This application is a continuation of U.S. patent application Ser. No. 16/065,122, filed on Jun. 21, 2018, now U.S. Pat. No. 10,461,907, which is the National Stage filing under 35 U.S.C. 371 of International Application No. PCT/KR2017/012667, filed on Nov. 9, 2017, which claims the benefit of U.S. Provisional Application No. 62/419,473, filed on Nov. 9, 2016, 62/444,296, filed on Jan. 9, 2017. 62/501,816, filed on May 5, 2017, 62/511,944, filed on May 26, 2017 and 62/557,071, filed on Sep. 11, 2017, the contents of which are all hereby incorporated by reference herein in their entirety.

TECHNICAL FIELD

The present specification relates to a wireless communication system, and more particularly, to a method for determining power boosting level of a phase tracking reference signal (PTRS) for phase noise cancellation and apparatus therefor.

BACKGROUND ART

An ultra-high frequency radio communication system using mmWave is configured to operate at a center frequency in the range of several GHz to several tens of GHz. Due to such a center frequency feature, significant path loss may occur in a shadow area in the mmWave communication system. Considering that a synchronization signal should be stably transmitted to all user equipments (UEs) located within coverage of a base station (BS), the synchronization signal needs to be designed and transmitted in consideration of the potential deep-null phenomenon, which may occur due to the above-described ultra-high frequency band characteristic, in the mmWave communication system.

DISCLOSURE OF THE INVENTION

Technical Task

The present invention is contrived to solve the aforementioned problems. Accordingly, an object of the present invention is to provide a method for determining power booting level of a PTRS.

Another object of the present invention is to achieve accurate decoding of received signals by improving a phase noise cancellation procedure performed by a user equipment (UE) in a wireless communication system.

A further object of the present invention is to provide a method for improving efficiency of signal transmission for phase noise cancellation.

Still another object of the present invention is to improve receiving-side operation by providing information on the signal transmission for the phase noise cancellation.

Still a further object of the present invention is to provide a method of transmitting a signal for the phase noise cancellation by considering compensation for phase noise and reference signal overhead.

Technical Solution

According to an embodiment of the present specification, provided is a method for transmitting a signal for phase noise cancellation by a base station (BS) in an mmWave communication system, including: generating a phase tracking reference signal (PTRS) for estimating phase noise of a downlink signal; transmitting PTRS power boosting level information for the PTRS to a user equipment (UE); and transmitting the PTRS via downlink signaling based on the PTRS power boosting level information. In this case, the PTRS power boosting level information may be determined based on at least one of the number of PTRS ports, the number of DMRS ports associated with the PTRS ports, or the number of DMRS ports in a DMRS port group associated with the PTRS ports.

According to an embodiment of the present specification, provided is a base station (BS) for transmitting a signal for phase noise cancellation in an mmWave communication system, including: a receiver configured to receive signals from external devices; a transmitter configured to transmit signals to external devices; and a processor configured to control the receiver and the transmitter. In this case, the processor may be configured to: generate a phase tracking reference signal (PTRS) for estimating phase noise of a downlink signal; transmit PTRS power boosting level information for the PTRS to a user equipment (UE) via downlink signaling; and transmit the PTRS based on the PTRS power boosting level information via downlink signaling. At this time, the PTRS power boosting level information may be determined based on at least one of the number of PTRS ports, the number of DMRS ports associated with the PTRS ports, or the number of DMRS ports in a DMRS port group associated with the PTRS ports.

Additionally, the following items can be commonly applied to a method and apparatus for transmitting a signal for phase noise cancellation in an mmWave communication system.

According to an embodiment of the present specification, the PTRS power boosting level information may indicate at least one of an on/off state of PTRS power boosting and a level value of the PTRS power boosting.

Additionally, according to an embodiment of the present specification, the PTRS power boosting level information for the PTRS may be transmitted to the UE explicitly or implicitly.

In this case, according to an embodiment of the present specification, the PTRS power boosting level information may be transmitted to the UE through DCI or RRC signaling.

Additionally, according to an embodiment of the present specification, the PTRS power boosting level information may be configured for the UE based on a predetermined rule.

In this case, according to an embodiment of the present specification, the predetermined rule may mean that the level value of the PTRS power boosting is determined based on the number of layers.

Additionally, according to an embodiment of the present specification, the predetermined rule may mean that the level value of the PTRS power boosting is determined based on the number of PTRS ports.

Additionally, according to an embodiment of the present specification, the predetermined rule may mean that the level value of the PTRS power boosting is determined based on the number of activated PTRS ports.

Additionally, according to an embodiment of the present specification, the level value of the PTRS power boosting may be any one of 3 dB, 4.77 dB, 6 dB and 9 dB.

Additionally, according to an embodiment of the present specification, when it is assumed that the number of layers is L, the level value of the PTRS power boosting may be determined according to the following equation: Power boosting level=10×Log 2(L)+Z dB, where Z may be indicated through at least one of RRC and DCI.

Additionally, according to an embodiment of the present specification, Z may be implicitly determined by MCS level. In this case, if the MCS level is equal to or lower than a threshold, Z may be set to 3 dB. On the contrary, if the MCS level is higher than the threshold, Z may be set to 0 dB.

Additionally, according to an embodiment of the present specification, the number of DMRS ports may correspond to the number of layers.

Additionally, according to an embodiment of the present specification, the level value of the PTRS power boosting may be expressed as an EPRE ratio between the PTRS and a physical downlink shared channel (PDSCH).

Advantageous Effects

According to the present specification, received signals can be accurately decoded by improving a phase noise cancellation procedure performed by a user equipment (UE) in a wireless communication system.

According to the present specification, a method for improving efficiency of signal transmission for phase noise cancellation can be provided.

According to the present specification, receiving-side operation can be improved by providing information on the signal transmission for the phase noise cancellation.

According to the present specification, a method for determining power boosting level of a PTRS can be provided.

According to the present specification, a method of transmitting a signal for the phase noise cancellation by considering compensation for phase noise and reference signal overhead can be provided.

It will be appreciated by persons skilled in the art that the effects that can be achieved through the present specification are not limited to what has been particularly described hereinabove and other advantages of the present invention will be more clearly understood from the following detailed description.

DESCRIPTION OF DRAWINGS

FIG. 1 is a diagram illustrating phase distortion due to phase noise.

FIG. 2 is a diagram illustrating block error rate (BLER) performance according to PTRS density in the frequency domain.

FIG. 8 is a diagram illustrating BLER performance measured based on PTRSs.

FIG. 10 is a diagram illustrating BLER performance measured based on PTRSs.

FIG. 11 is a diagram illustrating BLER performance measured based on PTRSs.

FIG. 12 is a diagram illustrating PTRS arrangement methods.

FIG. 18 is a diagram illustrating PTRS port patterns.

BEST MODE FOR INVENTION

Figure 3:
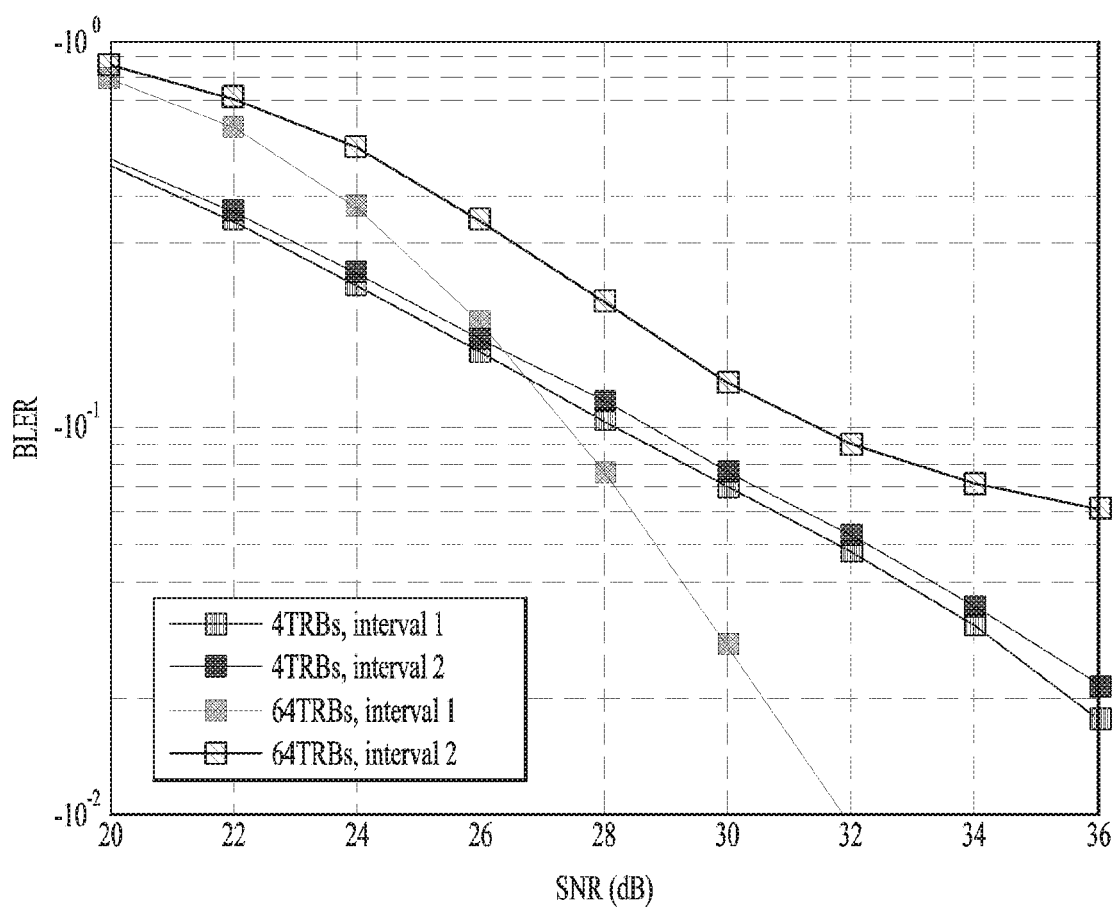
FIG. 3 is a diagram illustrating BLER performance according to PTRS density in the time domain.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this specification, the embodiments of the present invention have been described based on a data transmission and reception relationship between a mobile station and a base station. Here, the base station may mean a terminal node of the network which directly communicates with the mobile station. In this document, a specific operation described as performed by the base station can also be performed by an upper node of the base station.

That is, in the network consisting of a plurality of network nodes including the base station, various operations performed for communication with the mobile station may be performed by the base station or other network nodes except the base station. The term "base station" may be replaced with terms such as "fixed station", "Node B", "eNode B (eNB)", "advanced base station (ABS)", "access point", etc.

The term "mobile station (MS)" may be replaced with terms such as "user equipment (UE)", "subscriber station (SS)", "mobile subscriber station (MSS)", "mobile terminal", "advanced mobile station (AMS)", "terminal", etc.

In addition, a transmitting end refers to a fixed and/or mobile node that transmits data or voice services, and a receiving end refers to a fixed and/or mobile node that receive data or voice services. Accordingly, in uplink, the mobile station and base station may correspond to the transmitting end and receiving end, respectively. Similarly, in downlink, the mobile station and base station may correspond to the receiving end and transmitting end, respectively.

When a device performs communication with a 'cell', it may indicate that the device transmits and receive signals with a base station of the cell. That is, although the device actually transmits and receives signals with a specific base station, it can be interpreted to mean that the device transmits and receives signals with a cell formed by the specific base station. Similarly, "macro cell" and/or "small cell" may mean not only specific coverage but also "macro base station supporting the macro cell" and/or "small cell base station supporting the small cell".

The embodiments of the present invention can be supported by standard documents disclosed in at least one of wireless access systems including the IEEE 802.xx system, 3GPP system, 3GPP LTE system, and 3GPP2 system. That is, the steps or parts, which are not explained to clearly reveal the technical idea of the present invention, in the embodiments of the present invention may be supported by the above documents.

In addition, details of all terms mentioned in the present document can be found in the above standard documents. In particular, the embodiments of the present invention can be supported by at least one of documents P802.16e-2004, P802.16e-2005, P802.16.1, P802.16p and P802.16.1b, which are standard documents for the IEEE 802.16 system.

Hereinafter, the preferred embodiments of the present invention will be described in detail with reference to the accompanying drawings. It is to be understood that the detailed description which will be disclosed along with the accompanying drawings is intended to describe the exemplary embodiments of the present invention and is not intended to describe a unique embodiment for carrying out the present invention.

It should be noted that specific terms disclosed in the present invention are provided for better understanding of the present invention and these specific terms may be changed to other terms without departing from the technical scope or spirit of the present invention.

1. Phase Noise Analysis and Phase Tracking Reference Signal (PTRS) Design

FIG. 1 is a diagram illustrating phase distortion due to phase noise. The phase noise can be defined as fluctuation in the phase of a signal occurring during a short time. In this case, since the phase noise could randomly change the phase of the received signal in the time domain, it may interrupt the reception of the signal. For example, referring to FIG. 1(a), the phase noise may randomly occur. However, the phase noise may show certain correlation between adjacent time samples, which causes common phase error (CPE) and inter carrier interference (ICI) in the frequency domain.

FIG. 1(b) shows the effect of CPE and ICI on received constellation points. It can be seen from FIG. 1(b) that in square 'A', all constellation points are rotated in three degrees, which results from CPE. In addition, in circle 'B', constellation points are randomly placed, which results from ICI. Accordingly, CPE needs to be compensated due to the phase noise, and to this end, a phase tracking reference signal (PTRS) may be used for CPE estimation. Table 1 below shows simulation conditions related to the phase noise.

TABLE 1

| PN Model | PN model 2 in [2] | CFO | 0 kHz |
|---|---|---|---|
| Carrier Frequency | 30 GHz | # of Traffic RBs | 4/64 |
| Subcarrier Spacing | 60 kHz | # of System RBs | 100 |
| Channel | TDL-B(30 ns, 0 km/h) | Modulation | 64QAM |
| Channel Estimation | Ideal | Code Rate | 5/6 |
| CPE Estimation | Real | | |

Referring to Table 1, it can be seen how the PTRS impacts on the CPE estimation if the number of traffic RB is changed.

FIG. 2 is a diagram illustrating block error rate (BLER) performance according to PTRS density in the frequency domain. Specifically, FIGS. 2(a) and (b) show the result of measuring the BLER performance when the PTRS density is changed to 0, 1, 4, 8, and 16 in an OFDM symbol in the frequency domain. In this case, "PTRS=0" indicates no CPE compensation, and "Ideal" indicates the state in which CPE compensation is performed. More specifically, FIG. 2(a) shows the result of measuring the BLER performance by changing the PTRS density in the frequency domain in the case of 4-TRB, and FIG. 2(b) shows the result of measuring the BLER performance by changing the PTRS density in the frequency domain in the case of 64-TRB.

By comparing FIGS. 2(a) and 2(b), it can be seen that BLER performance difference according to the PTRS density increases as TRB size increases. Specifically, it can be seen from FIG. 2(a) where the TRB size is small that BLER performance difference between no CPE compensation and CPE compensation with PTRS=8 is only 1 dB. However, from FIG. 2(b) where the TRB size is large, it can be seen that BLER performance difference between no CPE compensation and CPE compensation with PTRS=8 is 5.8 dB.

In addition, referring to FIG. 2(b), it can be observed that as the PTRS density increases, the BLER performance is improved up to the ideal case based on the CPE compensation. Specifically, referring to FIG. 2(b), when the PTRS density is equal to or higher than 4, ideal BLER performance can be achieved. Thus, when the PTRS density is 4 or 8, the CPE compensation can be sufficiently achieved. In FIGS. 2(a) and 2(b), when the PTRS density is 4 or 8, the CPE compensation can be sufficiently achieved regardless of the TRB size.

FIG. 3 is a diagram illustrating BLER performance according to PTRS density in the time domain.

FIG. 3 shows the result of measuring the BLER performance by changing a PTRS interval in the time domain. In FIG. 3, the number of PTRSs in one OFDM symbol is 4. Referring to FIG. 3, it can be seen that the result is similar to that of FIG. 2. Specifically, it can be observed that as TRB size increases, BLER performance difference according to the PTRS density in the time domain increases. That is, when the TRB size is small (4 TRBs in FIG. 3), it is possible to obtain similar BLER performance without significant effects of the PTRS density in the time domain. However, it can be seen that when the TRB size is large (64 TRBs in FIG. 3), the BLER performance is significantly changed according to the PTRS density in the time domain. In other words, the BLER performance difference according to the PTRS density sensitively changes as the TRB size increases.

Figure 4:
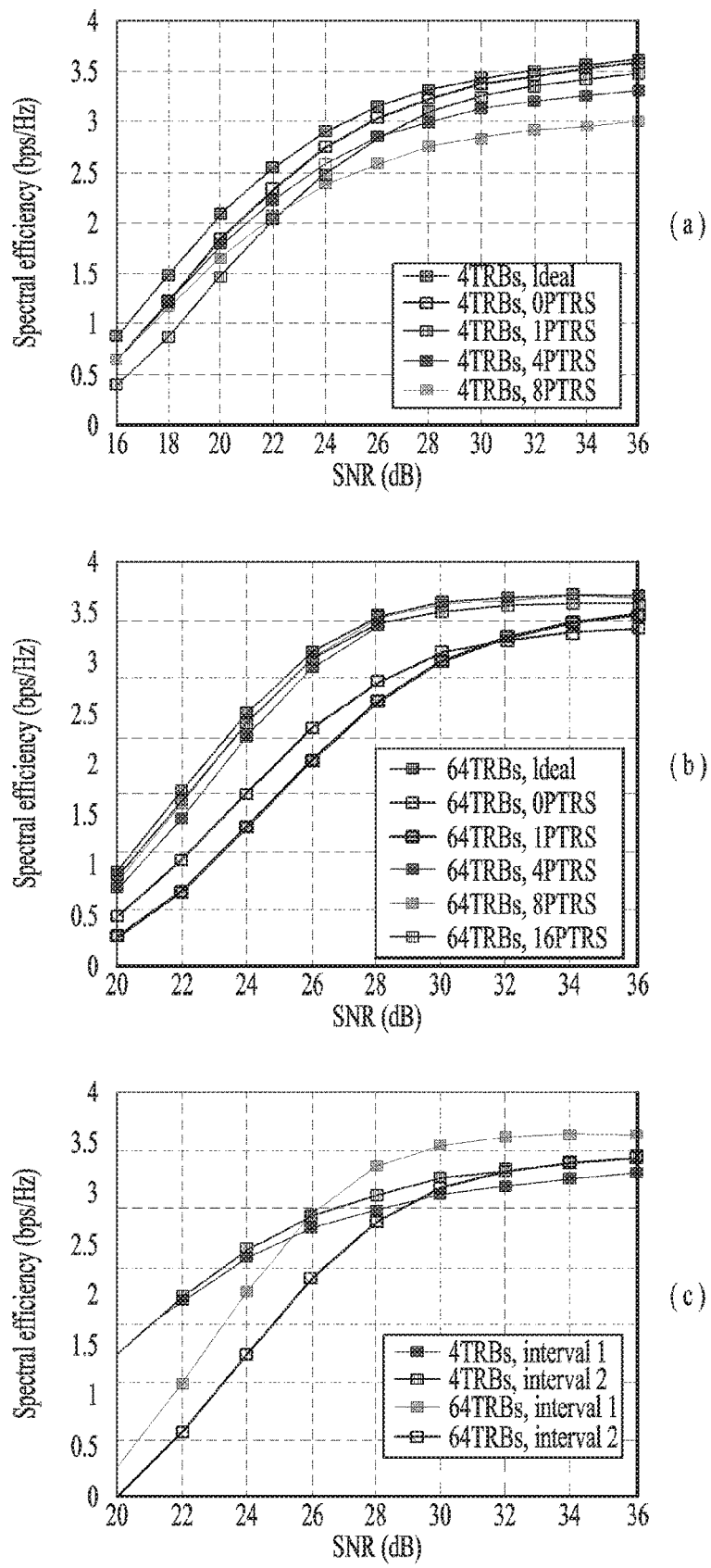
FIG. 4 is a diagram illustrating spectral efficiency for PTRS density according to different TRB size.

FIG. 4 is a diagram illustrating spectral efficiency for PTRS density according to different TRB size.

FIG. 4(a) shows spectral efficiency according to the number of PTRSs when TRB size is 4. Referring to FIG. 4(a), it can be seen that when the TRB size is 4, no CPE compensation has better spectral efficiency than CPE compensation with a certain number of PTRSs. When the TRB size is 4, only a single codeblock can be defined in a codeword. In addition, since the codeblock spreads out in the subframe, the impact of the phase noise may be reduced. In this case, similar to FIG. 2(a), when the TRB size is small, the CPE compensation is not significantly affected. Meanwhile, since information size increases as the number of PTRSs increases, throughput loss may occur due to a region where the PTRSs are allocated. In addition, when the TRB size is small, throughput loss may be greater than gain obtained from the CPE compensation, and thus PTRSs may be required no longer.

Meanwhile, referring to FIG. 4(b), it can be seen that when the TRB size is 64, the spectral efficiency is close to the ideal one as the number of PTRSs increases. This is because since when the TRB size is large, a plurality of codeblocks can be defined in one codeword and each codeblock spreads out in one or two OFDM symbols, it may significantly affects the phase noise. That is, when high phase noise occurs in a specific OFDM symbol, it may be difficult to successfully decode codeblocks located in the specific OFDM symbol. It can be similarly applied to FIG. 2(b). In other words, as the TRB size increases, the phase noise impact increases and overhead caused by PTRSs relatively decreases. Thus, when the number of PTRSs increase, throughput can be improved.

FIG. 4(c) shows the effect of changes in the PTRS density in the time domain, and it is similar to FIG. 3. That is, when the TRB size is small, the PTRS time density may not significantly affect the throughput. However, as described above, when the TRB size is large, the throughput may significantly vary according to the PTRS time density.

Figure 5:
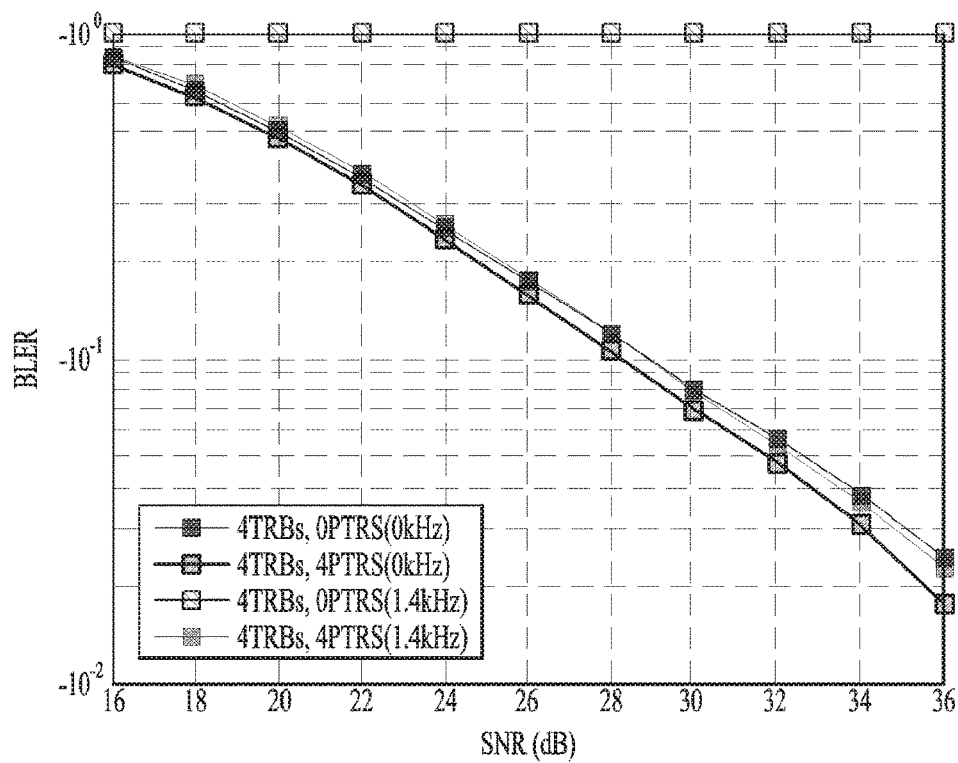
FIG. 5 is a diagram illustrating BLER performance according to carrier frequency offset (CFO).

FIG. 5 is a diagram illustrating BLER performance according to carrier frequency offset (CFO).

As described above, when the TRB size is small, the PTRS may become unnecessary. Nevertheless, the PTRS could be required for even small TRB because of CFO caused by oscillator error and Doppler. Referring to FIG. 5, it can be seen that in the case of CFO=1.4 kHz, BLER performance is degraded even when the TRB size is small, for example, 4. In this case, considering that CFO between the BS and UE may be ±0.1 ppm, the maximum CFO may be equal to 3 kHz for 30 GHz. That, when high frequency is used, the CFO may significantly affect the BLER performance. Therefore, the number of PTRSs should be determined in consideration of the CPE compensation and PTRS overhead, which are in a trade-off relationship, and it will be described later.

Figure 6:
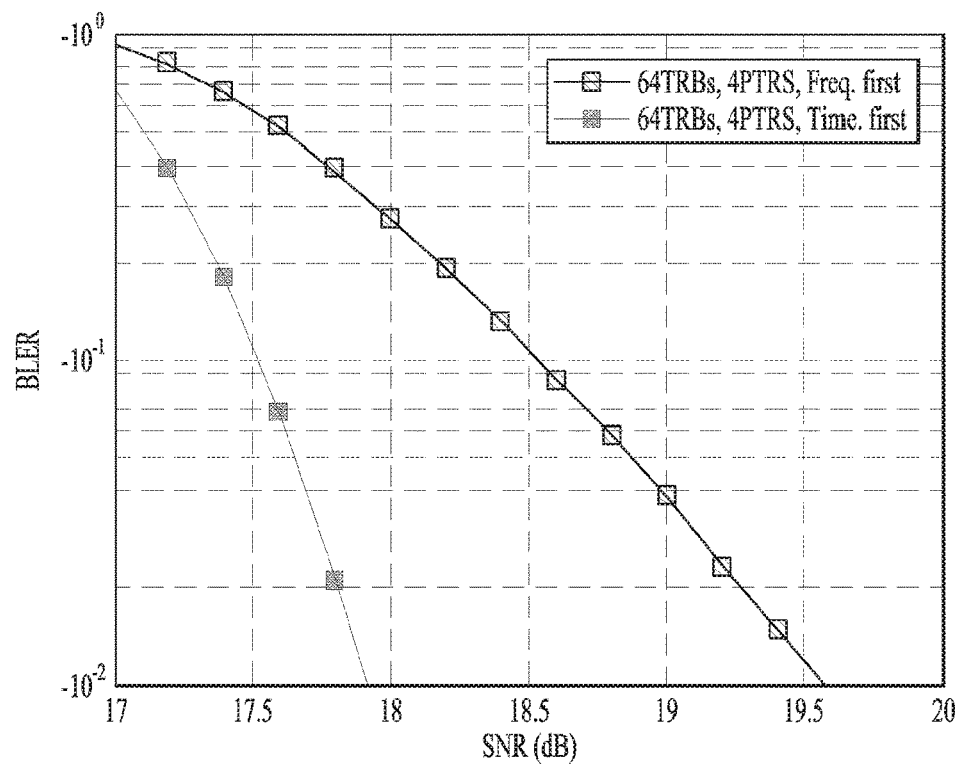
FIG. 6 is a diagram illustrating BLER performance according to PTRS mapping order: time first mapping and frequency first mapping.

FIG. 6 is a diagram illustrating BLER performance according to PTRS mapping order: time first mapping and frequency first mapping.

FIG. 6 shows a case where PTRSs are first mapped in the time domain and a case where PTRSs are first mapped in the frequency domain. Referring to FIG. 6, it can be seen that the case where PTRSs are first mapped in the time domain has better BLER performance than the case where PTRSs are first mapped in the frequency domain. This is because of the aforementioned ICI. That is, since when a codeblock is spread out in the time domain, the phase noise impact is reduced, the graph shown in FIG. 6 can be obtained. In addition, this also implies that codeblock spreading in the time domain is effective for reducing the phase noise, and details will be described later.

2. PTRS Design in Consideration of MCS Level

As described above, the PTRS needs to be used by considering the phase noise impact. In this case, PTRSs should be allocated by considering reference signal overhead as described above.

Figure 7:
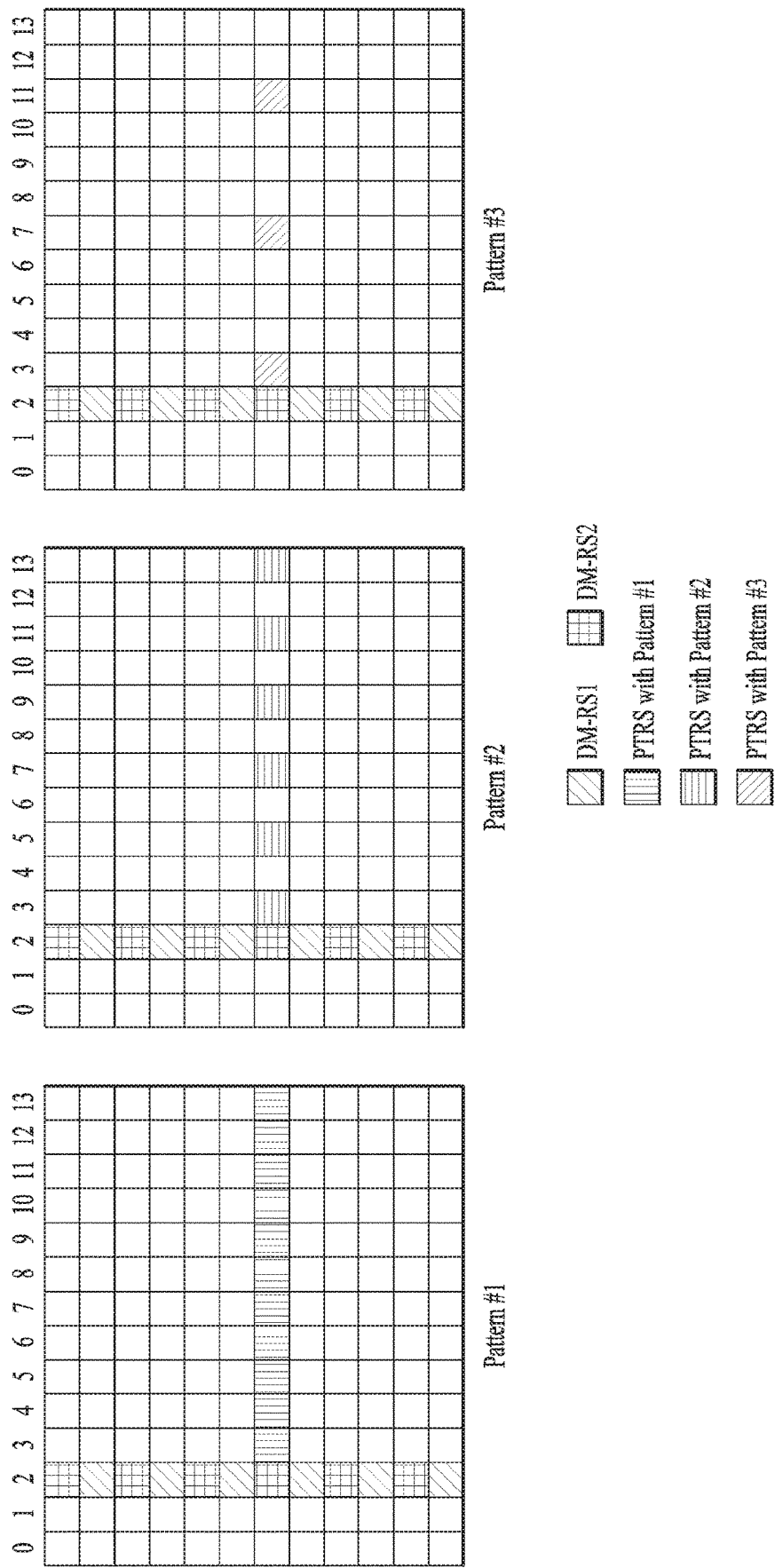
FIG. 7 is a diagram illustrating PTRS allocation patterns.

FIG. 7 is a diagram illustrating PTRS allocation patterns. Referring to FIG. 7, patterns #1 has a time period of 1, patterns #2 has a time period of 2, and patterns #4 has a time period of 4. That is, pattern #1 is a pattern where PTRSs are allocated with the highest density in the time domain, and pattern #3 is a pattern where PTRSs are allocated with the lowest density in the time domain. Table 2 below shows simulation setup configuration to check how each PTRS pattern shown in FIG. 7 affects performance degradation. For example, in Table 2, CFO may be randomly selected from the range of −3 kHz to 3 kHz, and modulation & code rate may be set to QPSK (1/2), 16QAM (3/4) and 64QAM (5/6).

TABLE 2

| PN Model | PN model 2 in [4] | CFO | [−3 kHz, 3 kHz] |
|---|---|---|---|
| Carrier Frequency | 30 GHz | # of Physical RBs | 4/32 |
| Subcarrier Spacing | 60 kHz | # of System RBs | 100 |
| Channel | CDL-C (30 ns, 3 km/h) | Modulation & Code Rate | QPSK (1/2), 16QAM (3/4), 64QAM (5/6) |
| Channel Estimation | Ideal | CPE Estimation | Real |

FIGS. 8 to 11 shows the results of measuring BLER performance based on Table 2, and from the drawings, the PTRS effect can be understood.

In this case, for example, FIG. 8(a) shows the impact of frequency offset on BLER performance in the absence of phase noise. Referring to FIG. 8(a), it can be seen that when there is no CFO compensation, the BLER performance is degraded even if an MCS level is low as QPSK (1/2), whereas when the CFO compensation is performed, the BLER performance can be maintained. That is, the CFO compensation can affect the BLER performance even at a low MCS level.

In addition, for example, FIG. 8(b) shows the impact of phase noise on BLER performance in the absence of frequency offset. Here, it can be seen that when the MCS level is high as 64QAM (5/6), the BLER performance is improved through CPE compensation, whereas when the MCS level is low as 16QAM (3/4), the same BLER performance is obtained regardless of whether the CPE compensation is performed. That is, as the MCS level is higher, the impact of the phase noise on the BLER performance may increase.

Figure 9:
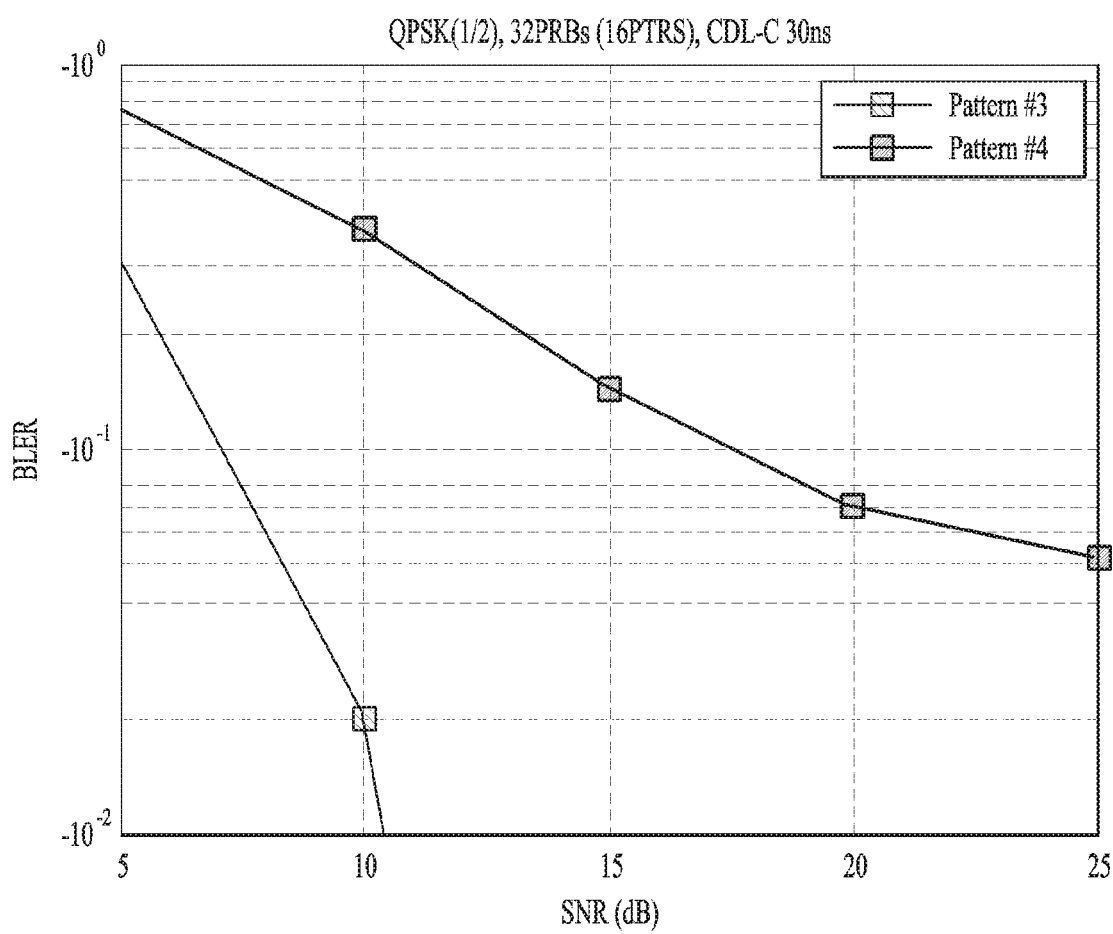
FIG. 9 is a diagram illustrating BLER performance measured based on PTRSs.

FIG. 9 shows elements that impact BLER performance when both phase offset and phase noise exist. It can be seen from FIG. 9 that the BLER performance significantly changes according to different PTRS patterns. That is, when both the frequency offset and phase noise exist, BLER performance degradation can be determined according to PTRS patterns.

FIG. 10 shows spectral efficiency according to MCS level. Referring to FIGS. 10(a) and 10(b), it can be seen that in the case of QPSK (1/2) and 16QAM (3/4), patterns #1, #2 and #3 shown in FIG. 7 achieve high spectral efficiency regardless of PRB size. That is, high spectral efficiency can be achieved because the phase noise impact can be negligible at low MCS level. In this case, for example, in FIG. 10(a), pattern #3 can achieve high spectral efficiency due to small PRB size considering reference signal overhead as described above.

FIG. 11 shows spectral efficiency according to MCS level. Referring to FIG. 11(a), it can be seen that in the case of 4 PRBs, patterns #1, #2 and #3 shown in FIG. 7 achieve high spectral efficiency regardless of PRB size. That is, high spectral efficiency can be achieved because the phase noise impact can be negligible at low MCS level. In this case, for example, in FIG. 11(a), pattern #3 can achieve high spectral efficiency due to small PRB size considering reference signal overhead as described above.

Referring to FIG. 11(b), it can be seen that in the case of 64QAM (5/6) and 32 PRBs, patterns #1 and #2 achieve high spectral efficiency. This is because since in the case of 32 PRBs, several codeblocks are defined in a codeword, and each codeblock spreads out in one or two OFDM symbols, it may significantly affects the phase noise. That is, when transmission is performed based on high MCS level and large PRB size, the phase noise may be affected more as described above.

In this case, for example, each UE can use the PTRS in performing uplink transmission. However, when there are a plurality of UEs, that is, in the case of UL MU-MIMO transmission, reference signal overhead may increase as the number of UEs increases. Thus, when the MCS level and PRB size are low and small, it should be determined whether the PTRS will be used, by considering the reference signal overhead.

As another example, in the case of DL transmission, since repeatedly transmitted signals (e.g., PSS, SSS) or channels (e.g., PBCH) are already designed, CFO can be estimated in advance of data reception. Thus, a PTRS pattern for high MCS level and large PRB size can be configured before data reception, but the invention is not limited thereto.

In addition, regarding the aforementioned reference signal, which is used in consideration of the phase noise and frequency offset, the configuration shown in Table 3 can be applied to design thereof, but the invention is not limited thereto.

TABLE 3

Agreements:
  For CP-OFDM waveform, for the RS enabling phase tracking, the following should be studied:
    Time domain pattern
      Alt-1: Continuous mapping, i.e., on every OFDM symbol
      Alt-2: Non-continuous mapping, e.g., every other OFDM symbol
      Switching between Alt-1 and Alt-2 can also be considered
    Frequency domain pattern
      Alt-A: Shared and across full carrier bandwidth with fixed density/spacing
      Alt-B: Within each UE's scheduled bandwidth and with configurable density/spacing
      Other patterns are not precluded
    Other properties
      UE-specific and/or non-UE-specific
      Port multiplexing such as FDM/TDM/CDM
      Potential sharing across users/streams
      On-off configuration
Agreements:
  At least the following RSs are supported for NR downlink
    CSI-RS: Reference signal with main functionalities of CSI acquisition, beam management
      FFS: RRM measurement
    DM-RS: Reference signal with main functionalities of data and control demodulation
      FFS: channel state information estimation and interference estimation
      FFS: beam management
    Reference signal for phase tracking
      FFS: Whether DM-RS extension can be applied or not
      FFS whether new RS or RS for other functionalities can be used
    Reference signal for time/freq. tracking
      FFS whether new RS or RS for other functionalities can be used
    Reference signal for Radio link monitoring
      FFS whether new RS or RS for other functionalities can be used
    RS for RRM measurement
      FFS whether new RS or RS for other functionalities can be used
  At least the following RSs are supported for NR uplink
    SRS: Reference signal with main functionalities of CSI acquisition, beam management
      FFS: RRM measurement
    DM-RS: Reference signal with main functionalities of data and control demodulation
      FFS: beam management
    Reference signal for phase tracking
      FFS: Whether DM-RS extension can be applied or not
      FFS whether new RS or RS for other functionalities can be used
      FFS: Reference signal for RRM measurement
      FFS whether new RS or RS for other functionalities can be used Proposal 1 (Fixing the Number of PTRSs in the Frequency Domain)

Referring to the drawings, it can be seen that when the number of PTRSs in the frequency domain is 4 or 8, a BLER performance curve approaches that in the ideal case. That is, the number of PTRSs in the frequency domain can be determined irrespective of the number of TRBs (or TRB size). In other words, the number of PTRSs in the frequency domain can be fixed to a specific value regardless of the number of TRBs.

Specifically, if the number of PTRSs in the frequency domain is assumed to be N, N can be defined as follows 1. N is determined as 4 or 8 regardless of the number of TRBs (N may be defined as a rule in the specification).

2. The value of N is informed through RRC and/or DCI.

That is, the number of PTRSs in the frequency domain may be determined as a predetermined specific value, for example, 4 or 8. As another example, the number of PTRSs in the frequency domain can be informed through RRC or DCI in advance. In this case, the above-described methods can be used by considering overhead caused by the PTRS as a reference signal.

FIG. 12 is a diagram illustrating PTRS arrangement methods. For example, in FIG. 13, the number of PTRSs in the frequency domain may be 4. In this case, a distributed type of PTRS and a localized type of PTRS can be used. For example, the distributed type means to design a frequency spacing between PTRSs to be uniform within a given TBS. On the other hand, the localized type means to locate PTRSs at the center of the given TBS or a specific position.

In this case, for example, the BS may inform the UE whether the distributed type or the localized type is used through RRC and/or DCI. Alternatively, one type may be defined as a predetermined arrangement method (one of the types may be defined as a rule in the specification). In addition, in the case of uplink transmission, control information may be signaled together, or a predetermined arrangement method may be used. However, the invention is not limited thereto.

As another example, the number of PTRSs in the frequency domain may be changed in consideration of TRB size.

This is because ICI caused by CFO degrades CFO and CPE estimation performance. In this case, as shown in the drawings, as the number of TRBs increases, the estimation performance is degraded, and thus the BLER performance may be degraded as well. However, since reference signal overhead decreases as the number of TRBs increases, it is possible to improve the estimation performance by allocating more PTRSs in the frequency domain. That is, the number of PTRSs in the frequency domain can be determined based on the number of TRBs by considering the BLER performance degradation and PTRS overhead. For example, the number of PTRSs can be defined as shown in Table 4. In this case, according to Table 4, when the number of TRBs (or TRB size) is equal to or smaller than N, the number of PTRSs in the frequency domain may be set to M1. On the contrary, when the number of TRBs is greater than N, the number of PTRSs in the frequency domain may be set to M2. In this case, for instance, the reference number of TRBs may be 8. In addition, M1 and M2 may be 4 or 8, respectively. However, the present invention is not limited thereto, and other specific values can also be used.

Additionally, for instance, N, M1, and M2 can be configured through RRC and/or DCI. Further, N, M1, and M2 may be determined in advance (values thereof may be defined as a rule in the specification).

TABLE 4

If TRB size <= N (e.g. 8)
    # of PTRS in the frequency domain = M1 (e.g.4)
Else
    # of PTRS in the frequency domain = M2 (e.g.8)

Proposal 2 (Changing an Interval Between PTRSs in the Time Domain According to TRB Size)

As described above, spectral efficiency can be changed according PTRS intervals in the time domain. Specifically, it can be seen from FIG. 3 that when the TRB size is 4, a case where the interval is 2 has better spectral efficiency than a case where the interval is 1. On the other hand, it can be seen that when the TRB size is 64, the case where the interval is 1 has better spectral efficiency than the case where the interval is 2. That is, as described above, as the TRB size decrease, the impact of reference signal overhead increases because throughput loss caused by the reference signal overhead may be greater than gain coming from CPE compensation. On the contrary, as the TRB size decreases, the spectral efficiency can be improved due to decrease in the reference signal overhead and increase in the gain from the CPE compensation.

In this case, for example, the PTRS interval in the time domain can be defined as shown in Table 5 below. Specifically, when the TRB size is equal to or smaller than N, the PTRS interval in the time domain may be set to M1. On the contrary, when the TRB size is greater than N, the PTRS interval in the time domain may be set to M2. In this case, M1 may be greater than M2. For instance, M1 and M2 may be set to 2 and 1, respectively, and N may be set to 8.

In other words, when the TRB size is small, the PTRS time interval may be increased by considering PTRS overhead. In contrast, when the TRB size is large, the PTRS time interval may be decreased by considering the CPE compensation.

Additionally, for instance, N, M1, and M2 can be configured through RRC and/or DCI. Further, N, M1, and M2 may be determined in advance (values thereof may be defined as a rule in the specification).

TABLE 5

If TRB size <= N (e.g. 8),
    PTRS time interval = M1(e.g. 2)
Else
    PTRS time interval = M2 (e.g. 1)

As another example, a code rate (CR) and modulation order (MO) may be further considered in determining the PTRS interval in the time domain. That is, the PTRS time interval can be determined by the TRB size, CR, and/or MO.

In FIG. 4(c), the MO and CR may be set to 64QAM and 5/6, respectively. For example, if the MO and/or CR increases, the PTRS time interval may be decreased from 2 to 1. Table 5 above can be modified by considering the MO and CR as shown in Table 6 below.

In addition, for instance, "If CR<=M (e.g. 5/6)" shown in Table 6 may be configured based on the MO, but the invention is not limited thereto. That is, even when the MO and/or CR increases, the PTRS time interval may be decreased even if the TRB size is small, but the invention is not limited thereto.

TABLE 6

If TRB size <= N (e.g. 8)
    If CR <= M (e.g. 5/6)
        PTRS time interval = 2
    Else
        PTRS time interval = 1
Else
    PTRS time interval = 1.

As another example, the PTRS can be used for CFO estimation. In this case, a BS may determine a random PTRS time interval and then signal to the UE the determined PTRS time interval. Alternatively, when only the CFO estimation is performed, the PTRS time interval may be determined in advance between a transmitter and a receiver, and only ON/OFF of the PTRS time interval may be signaled through DCI if necessary.

Figure 14:
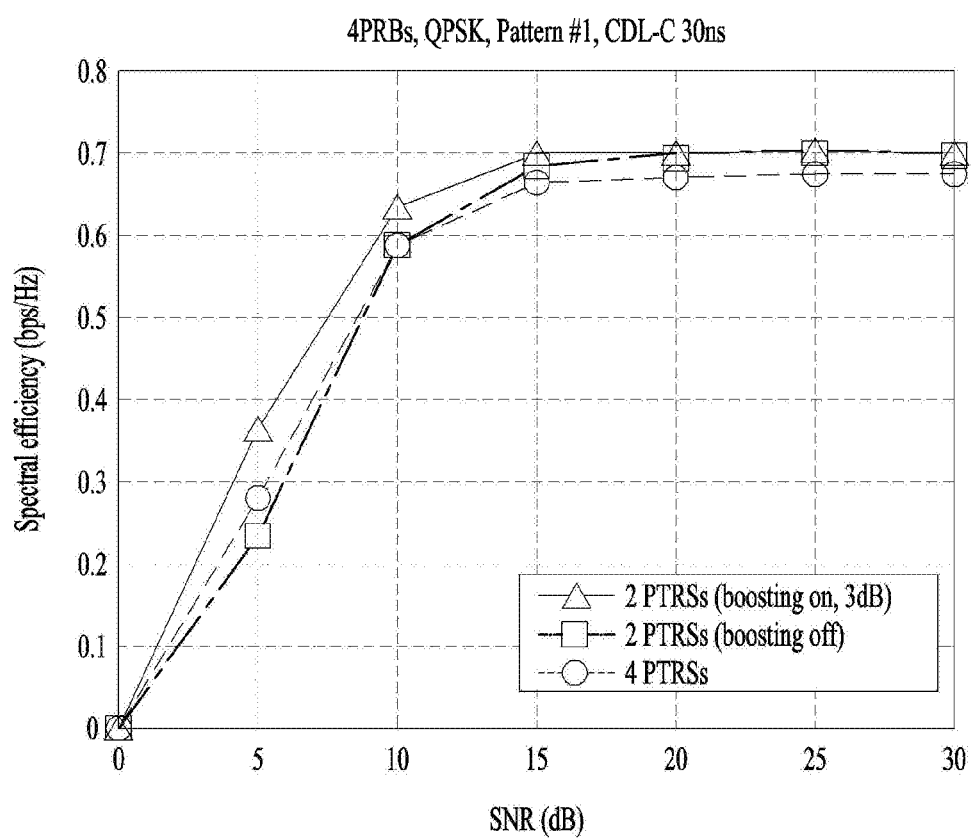
FIG. 14 is a diagram illustrating the number of PTRSs defined in the frequency domain depending on PRB size and spectral efficiency in accordance with presence of PTRS power boosting.

FIG. 14 is a diagram illustrating different PTRS patterns according to MCS level and PRB size as particular embodiments related to PTRS arrangement in the time domain.

Figure 13:
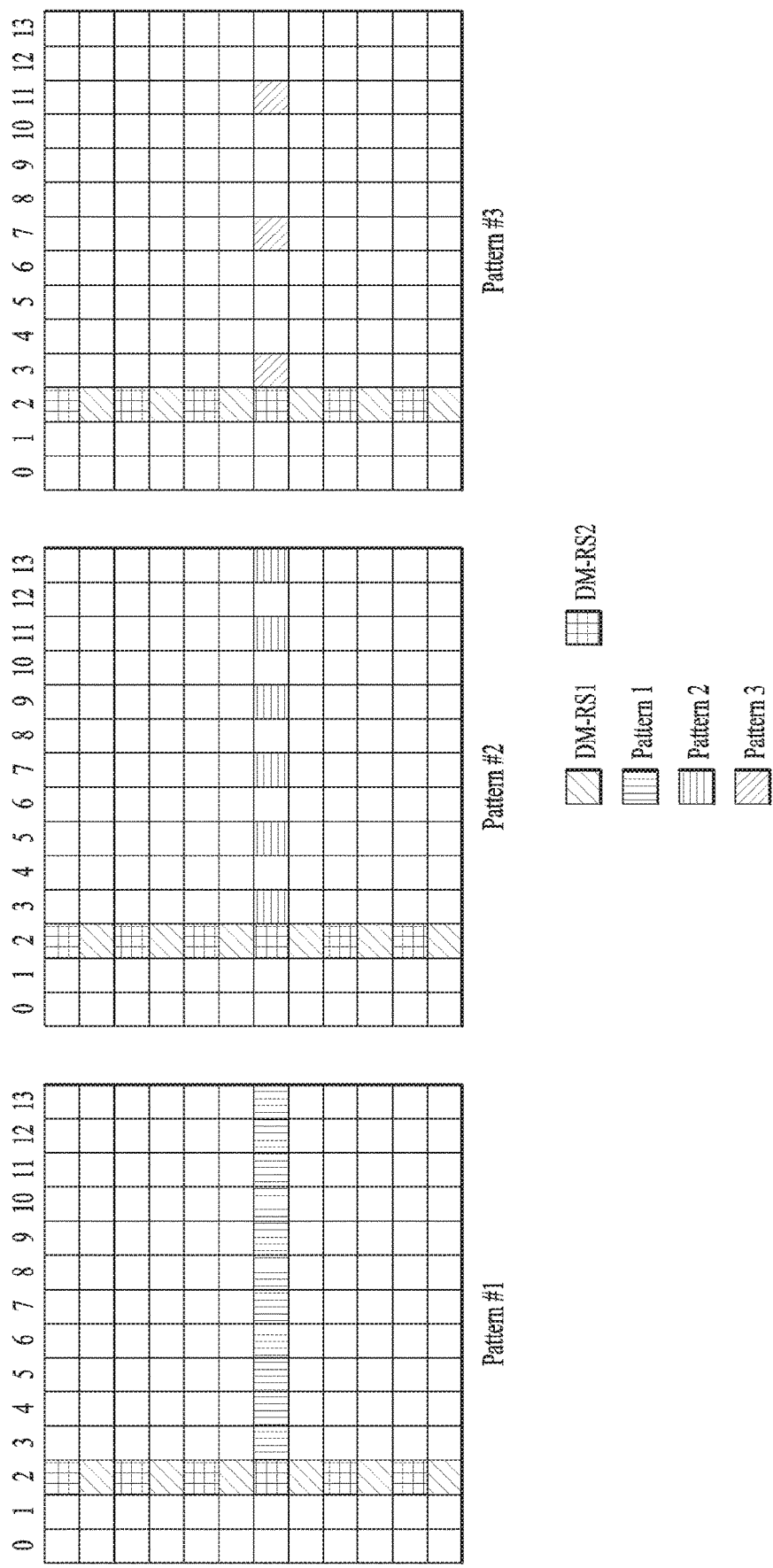
FIG. 13 is a diagram illustrating different PTRS patterns depending on MCS and PRB.

Specifically, FIG. 13 shows a case where PTRS patterns are defined according to different MCSs and PRBs, and patterns #1 to #3 may correspond to conditions 1 to 3 below. Meanwhile, the following mapping method may be configured for the UE through RRC, DCI, and/or a rule.

In this case, regarding the following conditions, pattern #1 has the shorted interval, and pattern #3 may have the longest interval. That is, when the MCS level is high and the PRB size is large, the PTRS time interval can be shortened. On the other hand, when the PRB size is small even though the MCS level is high, the PTRS timer interval may be increased. In addition, when the MCS level is low and the PRB size is small, the longest PTRS time interval may be configured. That is, as described above, as both of the PRB size and MCS level increases, the PTRS time interval may decrease. Based on this feature, different TRB patterns may be configured according to the MCS level and PRB size, and each pattern can be defined by considering the PTRS overhead.

1. High MCS (e.g. #26)+large PRB (e.g. 32 PRBs): Pattern 1
2. High MCS (e.g. #26)+middle PRB (e.g. 8 PRBs): Pattern 2

Proposal 3 (PTRS Mapping in Accordance with TRB Size)

The PTRS mapping method can be determined according to the TRB size. That is, one of time first mapping and frequency first mapping may be used according to the TRB size. For example, referring to FIG. 5, it can be seen that when data is mapped based on time first mapping, it is more robust to phase noise compared to frequency first mapping. That is, it is possible to reduce the phase noise impact.

In addition, for example, since only a single codeblock is defined in a codeword when the TRB size is small as described above, the effects of frequency first mapping and time first mapping are the same.

However, it can be seen that when the TRB size is large, the time-first mapping or code spreading in the time domain guarantees higher performance gain. Consequently, the PTRS mapping method should be considered when the TRB size is large, and it can be determined as shown in Table 7 below.

That is, when the TRB size is equal to or smaller than N, data can be mapped based on frequency first mapping. On the contrary, when the TRB size is greater than N, data can be mapped based on time first mapping, time-domain code spreading, or inter-CB interleaving. However, the present invention is not limited thereto.

In addition, for example, N may be set to 8. In this case, N may have a different value or defined as a predetermined value (it may be defined as a rule in the specification). Moreover, for example, N may be determined through DCI and/or RRC, but the invention is not limited thereto.

In addition, in the case of an ultra-reliable and low latency communications (URLLC) service where decoding latency is very important, frequency first mapping can be always applied regardless of N.

Moreover, when the code rate or modulation order is decreased, performance degradation caused by frequency first mapping is also decreased. Thus, in this case, N may be determined based on the TRB size, CR and/or MO. However, the invention is not limited thereto.

TABLE 7

1. In the case of TRB size <= N (e.g., 8), data is mapped based on

TABLE 7-continued frequency first mapping
2. In the case of TRB size > N, time first mapping, code spreading in the time domain, or new code spreading is performed on data Proposal 4 (a Method of Determining Whether PTRS Transmission will be Performed)

Whether the PTRS will be transmitted can be determined by TRB size, BS capability, and/or UE capability.

FIG. 4(a) shows that a case in which no PTRS is transmitted has better spectral efficiency than a case in which the PTRS is transmitted.

Meanwhile, FIG. 5 shows that when CFO of 1.4 kHz occurs, communication fails if no PTRS is transmitted. In this case, the magnitude of the CFO may be changed according to oscillators, that is, the UE and BS capabilities. If the CFO magnitude is extremely small due to excellent oscillators of the UE and BS and when the TRB size is small, it is better not to transmit the PTRS for high spectral efficiency.

In other words, whether the PTRS will be transmitted can be determined by the BS capability and UE capability as well as the TRB size. To this end, the UE may transmit information related to its CFO (e.g., oscillator, movement, or speed) to the BS. Thereafter, the BS may determine whether the PTRS will be transmitted based on the information received from the UE and its capability information. However, the invention is not limited thereto.

Hereinabove, the PTRS density in the frequency and time domains has been described. In the following description, PTRS arrangement methods will be explained.

Proposal 5-1 (a Method for Determining PTRS Power Boosting Level)

The PTRS power boosting level can be determined according to MCS level and/or PRB size (or TRB size). In this case, the PTRS power boosting level may be configured for the UE through RRC, DCI, and/or a rule.

Figure 15:
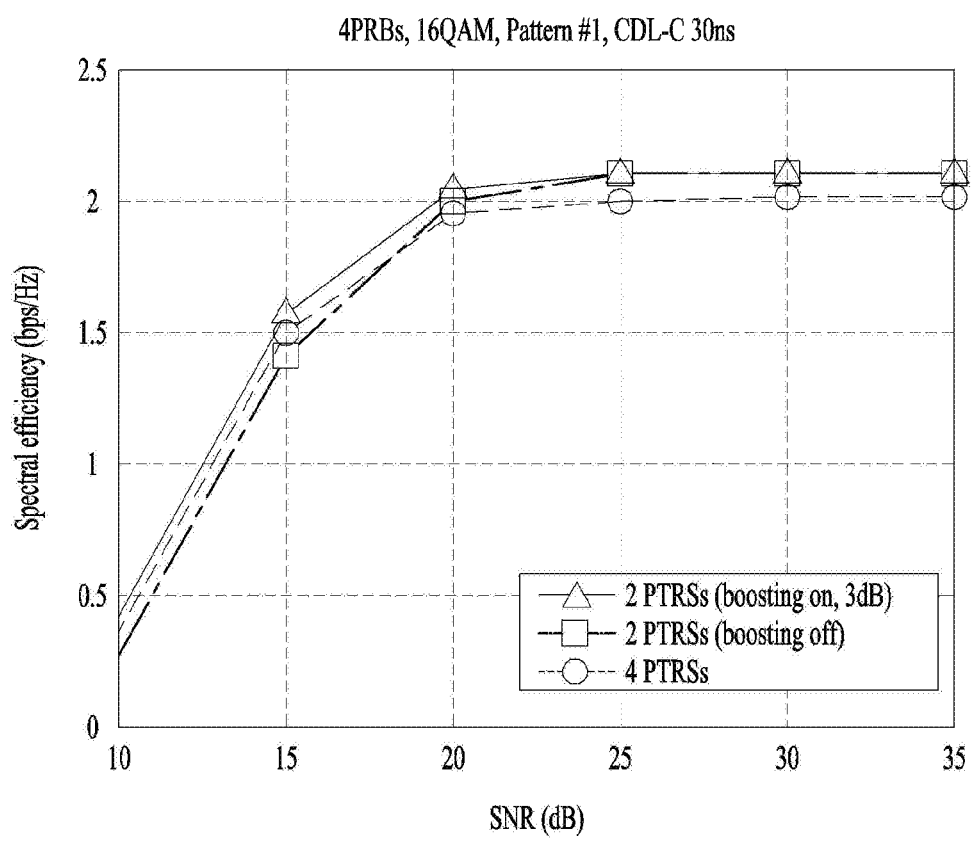
FIG. 15 is a diagram illustrating spectral efficiency at different MCS level.
Figure 16:
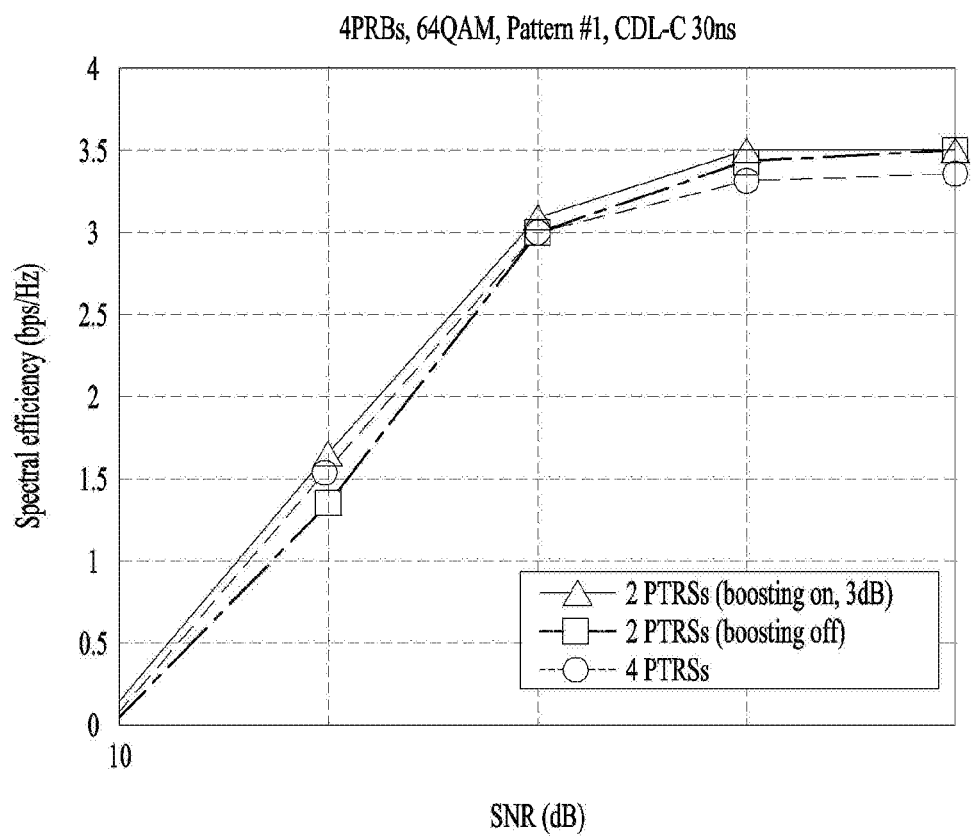
FIG. 16 is a diagram illustrating spectral efficiency at different MCS level.

Specifically, FIGS. 14 to 16 show spectral efficiency in accordance with the number of PTRSs defined in the frequency domain and presence of PTRS power boosting when the PRB size is 4. In this case, the PTRS power boosting may be defined as ON/OFF states.

For example, FIG. 14 is a diagram illustrating spectral efficiency in the case of 2 and 4 PTRSs in the state in which the PTRS power boosting is ON/OFF. When an SNR is low, a case where the two PTRSs are used in the state that the PTRS power boosting is OFF shows poor performance compared to a case where 4 PTRSs are used. In this case, the noise impact may increase at a low SNR. That is, since the noise impact increases at a low SNR, it is difficult to obtain sufficient CPE and CFO estimation. Thus, the case where the four PTRSs are used shows better performance than the case where the two PTRSs are used. Therefore, when the SNR is low, it is required to improve the performance by increasing the number of samples, that is, by referring to the case where the four PTRSs are used.

On the other hand, when the SNR is high, the noise impact may decrease. Thus, even though the number of PTRSs is small, it is possible to obtain sufficient CPE and CFO estimation. Referring to FIG. 15, when the SNR is high, a case where the number of PTRSs is two shows better performance than a case where four PTRSs are used. That is, in this case, CPE and CFO can be sufficiently measured although the number of PTRSs is small. Since overhead increases as the number of PTRSs increases as described above, its performance may be degraded.

As described above, when the PRB size is small and the SNR is low (i.e., low MCS), the spectral efficiency can be improved by increasing the number of PTRSs in the frequency domain. On the other hand, in this case, reference signal overhead may increase, and considering MU UL (multiuser uplink), other UEs need to be indicated that the number of PTRSs in the frequency domain increase, whereby an additional procedure is needed.

In this case, for example, referring to FIG. 14, when the PTRS power boosting is in the ON state, the case where the two PTRSs are used may always have better spectral efficiency than the case where the four PTRS are used. That is, the spectral efficiency can be further improved by turning on the PTRS power boosting compared to increasing the number of PTRSs in the frequency domain. That is, when the PTRS power boosting is on, the CPE and CFO measurement can be sufficiently performed and the number of PTRS samples does not increase so that reference signal overhead does not also increase. In addition, for example, since the number of PTRSs in the frequency domain does not increase in the above-described situation, it is not necessary to inform other UEs of increase or decrease in the number of PTRSs even in the case of MU UL.

In other words, it is possible to improve the performance through the PTRS power boosting by considering the SNR level without increase in the number of PTRSs in the frequency domain. In this case, unnecessary procedures may also be omitted.

In addition, for example, when the SNR is high, a high MCE can be selected in general. That is, when the SNR is high, a high MCE level may be selected. On the contrary, when the SNR is low, a low MCS level may be selected. Thus, a case where the SNR is high may correspond to a case where the MCS level is high, and a case where the SNR is low may correspond to a case where the MCS level is low. That is, as described above, the performance can be improved through the PTRS power boosting instead of adjusting the number of PTRSs in the frequency domain in accordance with the MCS level.

Specifically, FIGS. 15 and 16 are diagrams illustrating spectral efficiency at different MCS level. In this case, by comparing a case where two PTRSs are used and a case where four PTRSs are used in the state that boosting is off, it can be seen that the case where the two PTRSs are used has low spectral efficiency at a low SNR. It is the same as described above.

In this case, the UE may determine ON/OFF of PTRS power boosting according to allocated PRB size and MCS level under consideration of the above-mentioned situation. For example, the UE may determine ON/OFF of the PTRS power boosting either implicitly or explicitly.

In addition, for example, whether the PTRS power boosting is on or off may be determined as shown in Table 8 below. In this case, if the PRB size is 4 and the MCS level is equal to or lower than 16QAM, the PTRS power boosting can be on by setting two PTRSs in the frequency domain. On the other hand, if the PRB size is 4 and the MCS level is higher than 16QAM, the PTRS power boosting may be off by setting two PTRSs in the frequency domain Moreover, when the PTB size is 32 and the MCS level is equal to or lower than 16QAM, the PTRS power boosting may be on by setting four PTRSs in the frequency domain. Further, when the PRB size is 32 and the MCS level is higher than 16QAM, the PTRS power boosting may be off by setting four PTRSs in the frequency domain.

That is, whether the PTRS power boosting is on or off and the number of PTRSs may be determined according to at least one of the PRB size and MCS level.

In detail, when the PRB size is small and the MCS level is low, the performance can be improved through the PTRS power boosting by decreasing the number of PTRSs in the frequency domain. On the other hand, when the MCS level is high although the PRB size is small, the PTRS power boosting may be off because CPE and CFO can be sufficiently estimated. In this case, as described above, a high MCE level may be selected at a high SNR in general. In other words, the MCS level may correspond to the SNR level.

In addition, referring to the drawings, it can be seen that when the SNR is high, similar performance is obtained regardless of whether the PTRS power boosting is performed. Therefore, when the MCS level is high, the PTRS power boosting may be off.

In addition, when the PRB size is much larger, if the MCS level is low, the PTRS power boosting may be on without increase in the number of PTRSs in the frequency domain. Moreover, when the MCS level is high, the PTRS power boosting may be off as described above.

The PRB size and MCS level shown in Table 8 are merely examples. In addition, each of them may be configured based on other reference values, but the invention is not limited thereto.

TABLE 8

1. PRB size = 4, MCS level<=16QAM(code rate = 3/4)
   → The number of PTRSs in the frequency domain = 2, PTRS boosting on
2. PRB size = 4, MCS level>16QAM(3/4)
   → The number of PTRSs in the frequency domain = 2, PTRS boosting off
3. PRB size = 32, MCS level<=16QAM(3/4) ☐
   → The number of PTRSs in the frequency domain = 4, PTRS boosting on
4. PRB size = 32, MCS level>16QAM(3/4)
   → The number of PTRSs in the frequency domain = 4, PTRS boosting off Additionally, for instance, when the PTRS power boosting is on, a power boosting level value of the PTRS power boosting may be determined. In this case, the boosting level value may mean boosting level for average power of data symbols. Alternatively, the boosting level value can be expressed as a PTRS-to-PDCH EPRE ratio. In this case, a PDSCH may indicate average power of PDSCHs per layer or average power of data symbols per layer. However, the invention is not limited thereto.

Additionally, for example, the power boosting level may be set to 3/6 dB. This value may be configured for the UE through RRC, DCI, and/or a rule. However, the invention is not limited thereto.

That is, whether the above-described power boosting is on or off and the PTRS power boosting level value may be configured through RRC, DCI, and/or a rule. In this case, for example, it is possible to indicate whether the PTRS power boosting is on or off and the PTRS power boosting level value in different ways. That is, by considering overhead and latency, whether the PTRS power boosting is on or off is configured based on certain conditions, and the PTRS power booting level value may be signaled. This may be changed according to systems.

As another example, different PTRS power boosting level values may be configured according to the number of layers. In this case, for example, in the case of 2/4-layer transmission, power of each layer where each PDSCH is transmitted may be decreased by 3/6 dB compared to 1-layer transmission. In this case, power of the PTRS may also be decreased by 3/6 dB. Thus, to compensate the power reduction, the PTRS power needs to be boosted by 3/6 dB. However, since unnecessary power boosting is not efficient, the PTRS power boosting value may be set to 3 dB when the number of layers is small. That is, the PTRS power boosting level value may be determined in consideration of the number of layers, but the invention is not limited thereto.

In addition, it can be seen from FIG. 16 that when the MCS level is low, 3 dB boosting is useful for improving the performance. Thus, considering the above-described situation, 3 dB boosting may be necessary for a single layer, and in the case of 4 layers, 9 dB boosting may be required due to power compensation. In this case, for instance, the power boosting level value can be determined according to Equation 3 in consideration of the above-described situation. In this case, it can be seen from Equation 1 that the power boosting level value becomes greater as the number of layers increase. Moreover, for example, in Equation 1, the value of Z can be configured through RRC or as a rule (e.g., 3 dB, 6 dB, etc.) in the specification. However, the invention is not limited thereto.

Further, for instance, the value of Z can be implicitly determined. In this case, if the MCS level is low, the value of Z may be set to 3 dB. In addition, if the MCS level is high, the value of Z may be set to 0 dB. That is, similar to the operation principle, where the power boosting is on at low MCS level and off at high MCS level, the MCS level may be considered in determining the power boosting level. When the MCS level is low, higher power boosting level needs to be configured so that Z can be set to 3 dB. In addition, when the MCS level is high, high power boosting level is not required so that Z can be set to 0 dB. However, the invention is not limited thereto. Moreover, the MCS level may be determined based on a threshold. That is, when the MCS level is equal to or lower than the threshold, Z may be set to 3 dB. On the contrary, when the MCS level is higher than the threshold, Z may be set to 0 dB. In this case, the threshold may be merely a reference value, and thus it may be configured differently. Further, the invention is not limited thereto.

$$\text{Power boosting level}=10\times\text{Log }2(\#\text{ of layers})+Z\text{ dB} \quad \text{[Equation 1]}$$

Additionally, for example, in the above-described configuration, rules are previously defined between a transmitter and receiver. That is, this may mean when specific MCS level and PRB size is determined, the UE operates according to rules without any separate configuration. For instance, in the case of PRB size=4 and MCS level<=16QAM (code rate=3/4), the UE may perform PTRS transmission according to the condition of the number of PTRSs in the frequency domain=2 and 3/6 dB of PTRS boosting on. That is, the UE may operate according to the PRB size and MCS level, which corresponds to one condition.

As another example, the PTRS power boosting can be always performed regardless of the PRB size and MCS level. In this case, for instance, the above-mentioned boosting level value may be configured for the UE through RRC, DCI, and a rule. However, the invention is not limited thereto. That is, since the PTRS power boosting can be always on, it may not be separately signaled, and only the power boosting level value may be indicated. However, the invention is not limited thereto.

As described above, the PTRS can be used for noise reduction. In this case, whether PTRS power is boosted can be determined according to the aforementioned SNR level (or MCS level). In other words, ON/OFF of the PTRS power boosting can be determined according to the SNR level (or MCS level). That is, when the number of PTRS increases, reference signal overhead increase, and it may cause performance degradation. However, it is possible to improve the performance through the PTRS power boosting without increase in the number of PTRSs. Moreover, by doing so, the overhead may also be reduced because the number of PTRSs in the frequency domain does not increase. Further, since it is not necessary to inform other UEs of increase in the number of PTRSs even in the case of MU UL, efficiency can be improved as well.

Proposal 5-2 (Power Boosting According to PTRS Port Number)

Figure 17:
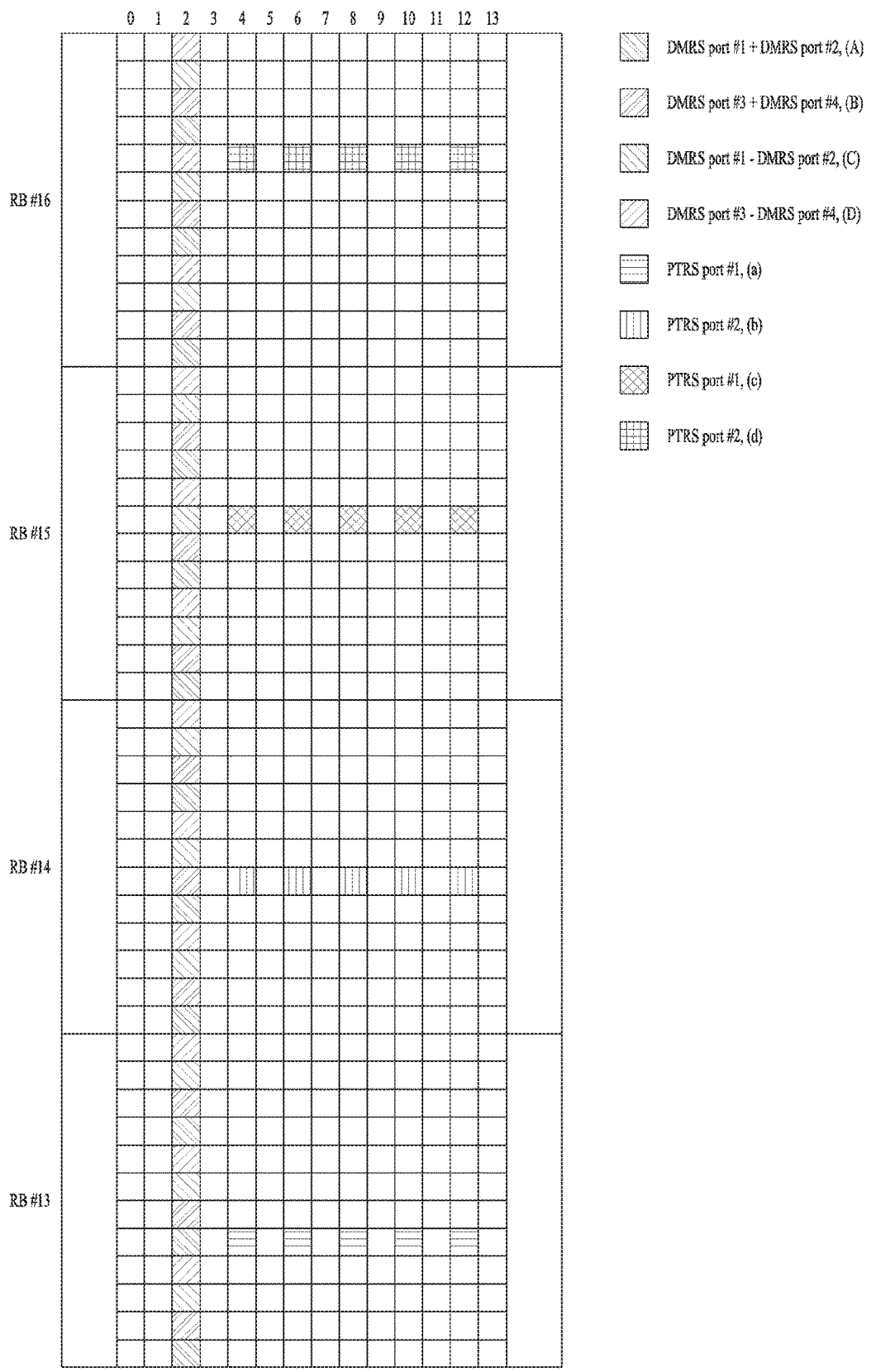
FIG. 17 is a diagram illustrating a method for applying multiplexing to orthogonal PTRS ports.

For PTRS ports, orthogonal PTRS multiplexing can be performed. Although FIG. 17 shows orthogonal PTRS multiplexing in downlink, it can be equally applied to uplink. In addition, although the invention is described on the assumption that an orthogonal cover code (OCC) (or cyclic shift (CS)) has a length of 2, the invention is not limited thereto, that is, can be applied when the OCC has a random length.

For example, when A and B are orthogonal to each other, it may mean that A and B should use different time/frequency/code resources. On the contrary, when A and B are non-orthogonal to each other, it may mean that A and B can use the same time/frequency/code resource. In addition, in FIG. 17, rate matching may mean that the UE does not expect data transmission in a corresponding region. That is, it may mean that the UE does not receive any data in the corresponding region. However, the invention is not limited thereto.

In addition, PTRS power boosting can be supported by PTRS ports, and FDM can be applied to the PTRS ports. Moreover, PTRS power boosting level may be configured for the UE based on at least one of RRC, MAC-CE, and DCI, or it may be defined as a rule in the specification. This will be described later.

Referring to FIG. 17, for example, four DMR ports and two PTRS ports may be configured. However, it is able to change the number of DMRs ports and the number of PTRS ports, but the invention is not limited thereto.

For example, two DMRs ports (e.g., DMRS ports #1 and #2) can be defined using the CS in the frequency domain. In this case, they may be arranged according to comb type 2. Using a liner combination of DMRS ports #1 and #2, (A) and (C) can be defined. That is, it is possible to define [DMRS port #1+DMRS port #2](=(A)) and [DMRS port #1−DMRS port #2](=(C)). In this case, based on DMRS ports #1 and #2, PTRS port #1 can be defined as (a) and (c). That is, PTRS port #1 can be defined on the same axis as the frequency domain in which DMRS ports #1 and #2 are defined.

In addition, for example, (B) and (D) can be defined using a liner combination of DMRS ports #3 and #4. That is, it is possible to define [DMRS port #3+DMRS port #4](=(B)) and [DMRS port #1−DMRS port #2](=(D)). In this case, based on DMRS ports #3 and #4, PTRS port #2 can be defined as (b) and (d). That is, PTRS port #2 can be defined on the same axis as the frequency domain in which DMRS ports #3 and #4 are defined.

Moreover, for example, in FIG. 17, PTRS port #1 may correspond to either (a) or (c). Similarly, PTRS port #2 may correspond to either (b) or (d). Specifically, a PTRS port may be set to have the same frequency location in each RB. That is, PTRS port #1 may correspond to either (a) or (c), or it may not be configured. Similarly, PTRS port #2 may correspond to either (b) or (d), or it may not be configured. For instance, when the two PTRS ports are allocated to one UE, PTRS port #1 may be allocated to either (a) or (c), and PTRS port #2 may be allocated to either (b) or (d). FIG. 17 is an embodiment for showing each case, and it can be individually interpreted with respect to each RB as described above. The frequency-domain position of the PTRS port may be allocated to a position where at least one DMRS port in a DMRS port group associated with the PTRS port is located. In this case, the DMRS port group associated with the PTRS port may have the same phase source. Further, a time-domain position of the PTRS port may be determined according to pattern #1 or #2 shown in FIG. 18. That is, it may be allocated to all OFDM symbols or based on a certain pattern. However, the invention is not limited thereto. For instance, the time-domain pattern may be configured for the UE through at least one of RRC, MAC CE, and DCI. In addition, for example, it may be defined as a rule in the specification. Moreover, multiplexing may be performed on PTRS ports based on SU (single user). Alternatively, multiplexing may be performed on PTRS ports based on MU (multi user).

When the PTRS port multiplexing is performed based on the SU, a plurality of PTRS ports may be defined for a single UE in an orthogonal manner. For example, DMRS ports #1 and #3 may be defined for the UE. In this case, a PTRS port corresponding to DMRS port #3 may be PTRS port #3. In this case, PTRS ports may be defined to be orthogonal to each other.

However, the aforementioned port number may be merely an example. Specifically, a plurality of PTRS ports allocated to one UE may be defined to be orthogonal, but the invention is not limited to port numbers. For example, in FIG. 17, PTRS ports #1 and #2 may be allocated to one UE, and they may be defined to be orthogonal. Although PTRS ports #2 and #3 are mentioned in the present invention, orthogonal PTRS ports can be defined for one UE without being limited to port numbers.

In addition, when the PTRS port multiplexing is performed based on the MU, a plurality of PTRS ports associated with a plurality of DMRS ports defined using different OCCs (or CSs) may be orthogonal to each other in order to support the multiplexing.

In this case, for example, the BS may inform the UE of the PTRS power boosting level using at least one of RRC, MAC-CE, and DCI as described above. In addition, the PTRS power boosting level may be defined as a rule in the specification.

In this case, for example, when one PTRS port is received in the SU-based case and MU-based case, data may not be transmitted through another PTRS port. For instance, when PTRS port #1 is received, data may not be transmitted through PTRS port #2. In addition, when PTRS port #1 is received, data may not be transmitted through PTRS port #3. Thus, power for PTRS port #1 may be boosted using power allocated for PTRS port #2 (or PTRS port #3). In this case, power boosting level may be defined through association with the number of zero power (ZP) PTRSs defined in the same OFDM symbol. That is, the power boosting level may be determined based on the number of PTRS ports of which power is zero in the same OFDM symbol. In this case, for example, referring to FIG. 17, when only one PTRS port is used after configuration of two PTRS ports, the power boosting level may be defined as 3 dB.

For instance, the PTRS power boosting level may be expressed as a PTRS-to-PDSCH power ratio. In this case, since if the number of PTRS ports is one, there is no ZP PTRS for the power boosting, the PTRS power boosting level may be set to 0 dB. On the other hand, when there are two or more PTRS ports, if one PTRS port is received and data is not transmitted through other ports, the PTRS power boosting level may be set to 3 dB.

Further, the power boosting level can be equally applied to both the SU-based case and MU-based case, but the invention is not limited thereto.

Proposal 6-1 (Power Boosting in Accordance with PTRS and DMRS Mapping)

Orthogonal multiplexing can be applied to PTRS and data transmission and reception at a single UE. Thus, PTRS resource elements do not overlap with data resource elements in the UE. In addition, for example, a plurality of PTRSs can be defined for the UE. In this case, assuming that the number of DMRS ports mapped to an $n^{th}$ PTRS port is Nn and the total number of DMRS ports is N, the $n^{th}$ PTRS port can be power-boosted by N/Nn. That is, PTRS power can be boosted by N/Nn in order to use the maximum available transmit power per resource element.

In this case, for example, the UE may implicitly determine boosting level in accordance with a mapping relationship between an $n^{th}$ PTRS and DMRSs. In addition, for example, the possibility of the aforementioned power boosting and/or a boosting value can be explicitly indicated through at least one of RRC, DCI, and MAC-CE. As another example, the possibility of the aforementioned power boosting and/or the boosting value may be determined by a rule, but the invention is not limited thereto. Moreover, for example, whether the power boosting is performed may be configured by the BS through at least one of RRC and DCI, or it may be determined by a rule. However, the invention is not limited thereto.

As a further example, a mapping relationship between PTRSs and DMRSs may be implicitly determined by a rule. In addition, for example, the mapping relationship between PTRSs and DMRSs may be explicitly indicated through at least one of RRC, DCI, and MAC-CE.

As still another example, when the UE explicitly informs the UE of PTRS ports through at least one of RRC, DCI, and MAC-CE, the UE can be aware of the mapping relationship between PTRSs and DMRSs using it.

For instance, PTRS port #1 may be mapped to DMRS ports #1 and #2, and PTRS port #2 may be mapped to DMRS ports #3 and #4. Alternatively, in this embodiment, PTRS port #1 may be mapped to DMRS port #1, and PTRS port #2 may be mapped to DMRS port #3. However, this is merely an example, and the invention is not limited to the above-described embodiment.

Further, the above-described proposal is not limited to uplink but can be equally applied to downlink for power boosting. However, the invention is not limited thereto.

Proposal 6-2 (PTRS Power Boosting Based on the Number of Layers in Associated DMRS Port Group)

PTRS and DMRS ports may be in a quasi-co-location (QCL) relationship. That is, for large scale property, PTRS and DMRS ports may be equally applied. However, for example, when PTRS power boosting is performed, QCL may not be applied regarding an average gain between PTRS and DMRS ports. That is, in this situation, a separate definition may be required for QCL.

For example, the UE may determine downlink PTRS power boosting level based on total layers of a DMRS port group including a PTRS. Specifically, the power boosting level may correspond to a power offset value of a single layer transmitted through a PDSCH. In this case, the layer may be restricted such that it should be included in the DMRS port group associated with the PTRS. In this case, the PTRS power boosting level can be determined according to Equation 2 below.

$$\text{PTRS Power boosting level} = 10 \times \log 10(L) \quad \text{[Equation 2]}$$

In Equation 2, L is the number of total layers in the DMRS port group associated with the PTRS port. That is, the PTRS power boosting level may be determined based on the number of total layers in the DMRS port group.

For example, it is assumed that two DMRS port groups, i.e., DMRS port group #0 and DMRS port group #1 have two and three layers, respectively. In this case, if only DMRS port group #0 transmits PTRS port #0, the PTRS power boosting level becomes 3 dB. That is, in Equation 2, L is 2, and the PTRS power boosting level may be 3 dB>

In addition, for example, the number of layers may correspond to the number of DMRS ports. That is, the number of total layers in the DMRS port group may be equal to the number of DMRS ports. In this case, for example, considering a relationship with Proposal 6-1, Proposal 6-2 may be applied when a plurality of DMRS port groups exist. For example, DMRS port group #1 and DMRS port group #2 may exist. In this case, it can be assumed that DMRs ports #1 and #2 belong to DMRS port group #1, and DMRS ports #3, #4, and #5 belong to DMRS port group #2. If PTRS port #1 and PTRS port #2 correspond to DMRS port #1 and DMRS port #3, respectively, the number of layers may correspond to the number of DMRS ports as described above, and thus PTRS port #1 can be boosted by 10*log 10(2). And, PTRS port #2 can be boosted by 10*log 10(3).

Moreover, for instance, when only DMRS port group #1 transmits PTRS port #0, the PTRS power boosting level may be 4.77 dB. That is, in Equation 2, L is 3 and the PTRS power boosting level may be 4.77 dB.

Figure 19:
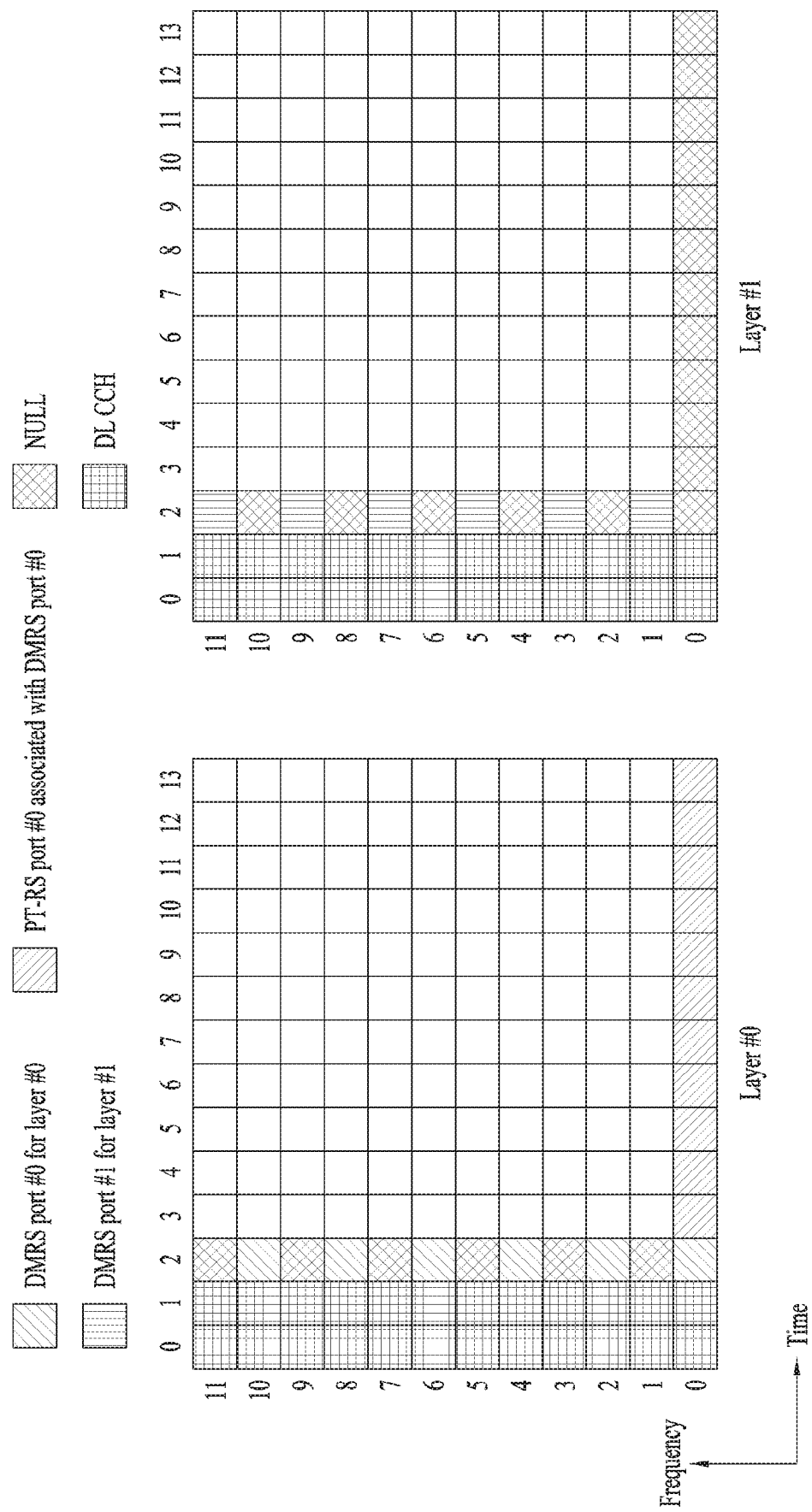
FIG. 19 is a diagram illustrating a method for performing power boosting based on an activated PTRS port.

As another example, the UE may determine the PTRS power boosting level based on the number of total layers in a DMRS port group including a PTRS and the number of other DMRS port groups where the PTRS is transmitted. Specifically, referring to FIG. 19, it can be seen that DMRS ports #0 and #1 belong to different DMRS port groups, and only PTRS port #0 is transmitted. In this case, since there is no layer or RE from which power is brought, PTRS port #0 may not be power-boosted. That is, since the number of total layers in the DMRS port group is 1, the power boosting cannot be performed.

As a further example, data may not be transmitted in a PTRS region allocated to a different UE. That is, REs for the PTRS may not be used regardless of whether the different UE uses the PTRS. In this case, since data is not transmitted through PTRS ports, a UE may use corresponding power for the PTRS power boosting. For instance, when data is not transmitted through port #2, the UE may boost PTRS power for port #1 based on power for port #2. However, the invention is not limited thereto. In this case, whether the power booting will be performed may be configured by the BS through at least one of DCI and RRC. In addition, it may also be defined in the specification. However, the invention is not limited thereto.

Figure 20:
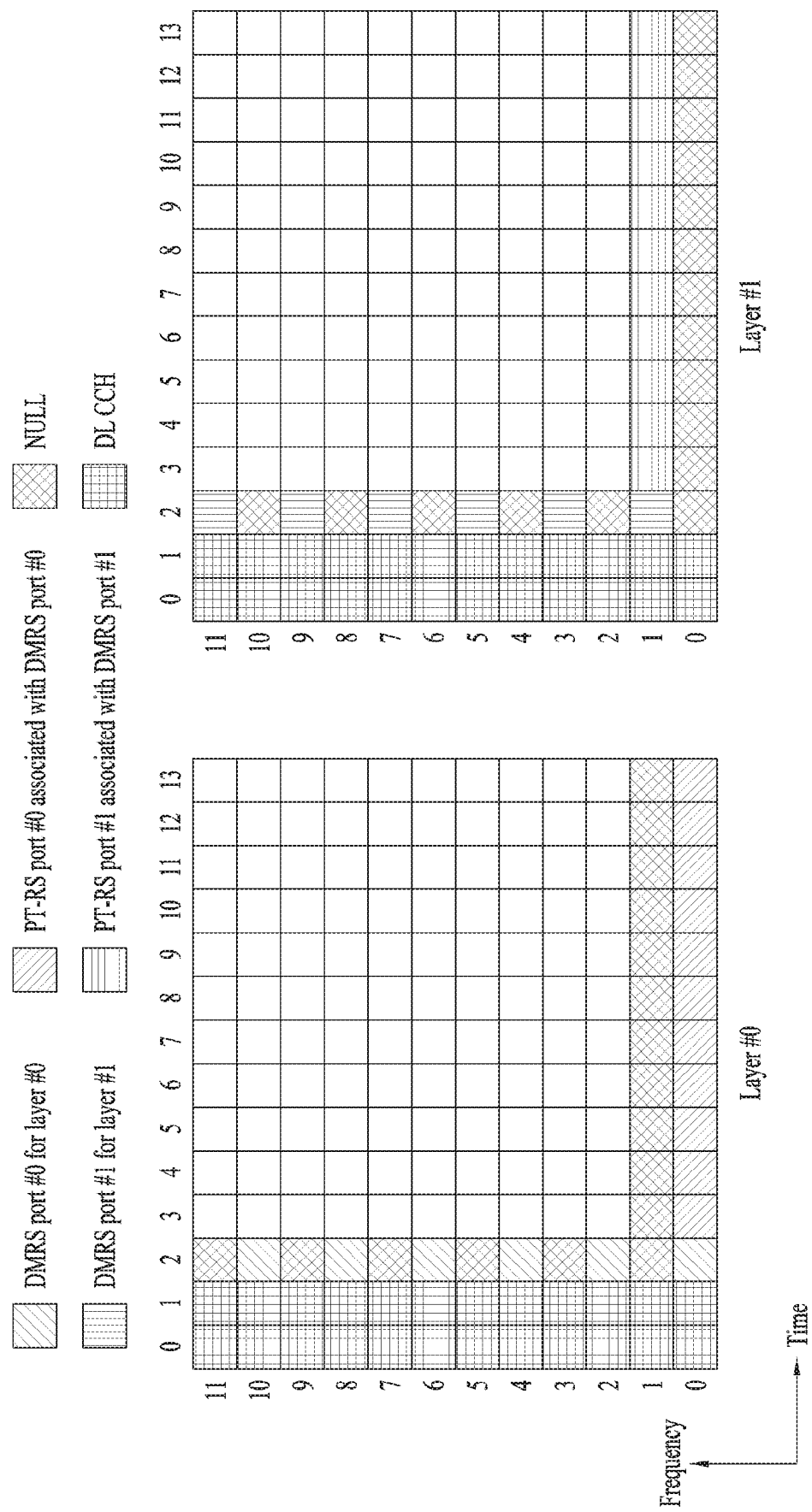
FIG. 20 is a diagram illustrating a method for performing power boosting based on activated PTRS ports.

For example, considering the above-described situation, it is assumed with reference to FIG. 20 that DMRS ports #0 and #1 belong to different DMRS port groups, and PTRS ports #0 and #1 are transmitted. In this case, there may be another RE from which capable of providing power for PTRS port #0. That is, since there is an RE where PTRS port #1 is transmitted, the PTRS power boosting can be performed.

In other words, if there is an activated PTRS port, the power boosting can be achieved through an RE for the PTRS port. Thus, Equation 2 can be modified to Equation 3.

$$\text{PTRS Power boosting level} = 10 \times \log 10(L) + 10 \times \log 10(P) \quad \text{[Equation 3]}$$

In Equation 3, L is the number of total layers in the DMRS port group associated with the PTRS port as described above, and P is the total number of activated PTRS ports. That is, the PTRS power boosting level can be determined by considering both the number of total layers in the DMRS port group and the number of activated PTRS ports.

In this case, for example, if the PTRS power boosting level is equal to or greater than a threshold, the PTRS power boosting level may be limited to a specific value. That is, the PTRS power boosting level may be limited not to exceed the threshold. For example, when the PTRS power boosting level is equal to or greater than 6 dB, it may be set to 6 dB. In other words, the threshold may be set to 6 dB. In this case, the threshold may be specified either through a higher layer signal or by a rule. Alternatively, it may be defined in the specification in advance.

As a particular example, a case where both DMRS port group #0 and DMRS port group #1 transmit PTRS ports #0 and #1 may be considered. In this case, PTRS power boosting level of PTRS port #0 may be limited to 6 dB, and PTRS power boosting level of PTRS port #1 may be limited to 7.77 dB. However, the invention is not limited thereto.

As another example, it is assumed that the number of layers of DMRS port group #0 is 2, the number of layers of DMRS port group #1 is 3, the number of layers of DMRS port group #2 is 1, and the number of layers of DMRS port group #3 is 2. In this case, if all the above DMRS port groups transmit PTRS ports #0, #1, #2, and #3, power boosting level for each PTRS port may be determined as shown in Table 3. That is, the power boosting level may be determined based on Equation 3 above.

TABLE 9

PTRS Power boosting level of PTRS port #0 = 10log10(2) + 10log10(4)
PTRS Power boosting level of PTRS port #1 = 10log10(3) + 10log10(4)
PTRS Power boosting level of PTRS port #2 = 10log10(1) + 10log10(4)
PTRS Power boosting level of PTRS port #3 = 10log10(2) + 10log10(4)

Figure 21:
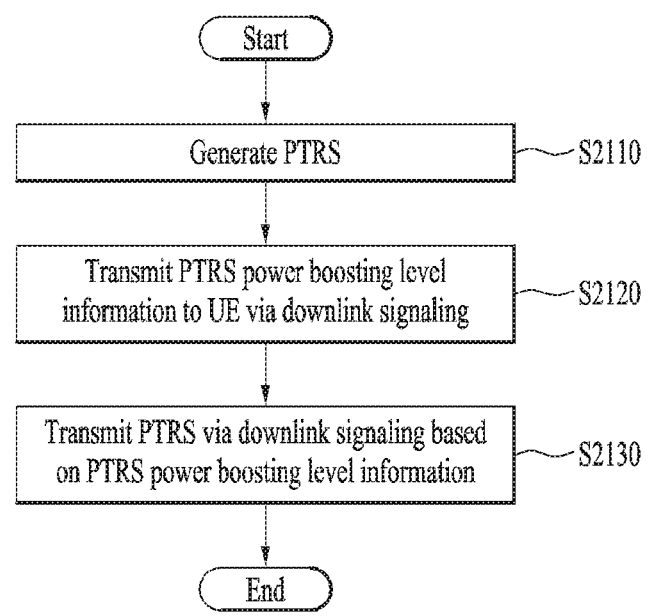
FIG. 21 is a flowchart illustrating a method for transmitting a signal for phase noise cancellation by a BS in a communication system.

FIG. 21 is a flowchart illustrating a method for transmitting a signal for phase noise cancellation by a BS in a communication system.

The BS can generate a PTRS [S2110]. In this case, the PTRS transmitted by the BS may be a reference signal for phase noise cancellation as described above with reference to FIGS. 1 to 20.

Next, the BS can transmit, to a UE, PTRS power boosting level information through downlink signaling [S2120]. In this case, the PTRS power booting level information may be determined at least one of MCS level and PRB size as described above with reference to FIGS. 1 to 20. In addition, for example, the PTRS power boosting level information may be configured for the UE through RRC, DCI, and/or a rule. In this case, for instance, the PTRS power boosting level information may be information indicating ON/OFF of PTRS power boosting. For example, as described above, when the MCS level is lower than a predetermined value, the PTRS power boosting may be on. In this case, for instance, the predetermined value for the MCS level may be 16QAM. Moreover, when the PRB size is small, the number of PTRSs in the frequency domain decreases, and the PTRSs may be power-boosted as described above.

That is, when the MCS level is equal to or lower than the predetermined value, the number of PTRSs in the frequency domain may be determined as a preconfigured value by considering the PRB size. In addition, when the MCS level is higher than the predetermined value, the PTRS power boosting may be off as described above. Moreover, for example, since the MCS level is determined to be higher when an SNR is high, the PTRS power boosting may be off at the high SNR as described above.

Thereafter, the PTRS can be transmitted based on the PTRS power boosting level information [S2130]. In this case, PTRS power boosting level may be information indicating whether the PTRS power boosting is on or off. In addition, it may be a level value for the PTRS power boosting. In this case, for example, the level value for the PTRS power boosting may be 3 or 6 dB. As another example, the level value for the PTRS power boosting may be determined based on the number of layers as described above.

Figure 22:
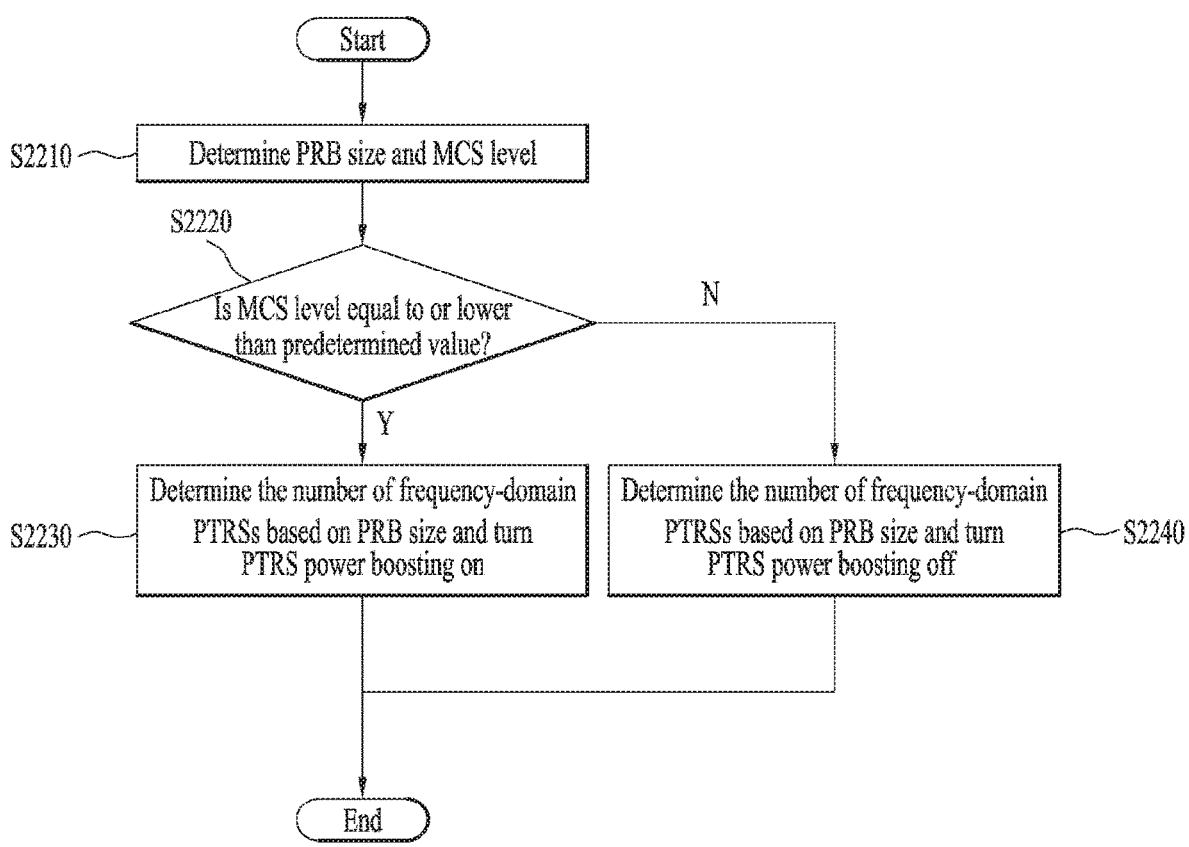
FIG. 22 is a diagram illustrating a method for determining whether to perform PTRS power boosting.

FIG. 22 is a diagram illustrating a method for determining whether to perform PTRS power boosting. First, PRB size and MCS level can be determined [S2210]. In this case, as described above with reference to FIGS. 1 to 21, PTRS power boosting level for PTRSs may be determined based on the determined PRB size and MCS level. In this case, as the PRB size decreases, the number of PTRSs may decrease. In addition, as the PRB size increases, the number of PTRSs may increase. Moreover, for example, as described above, when an SNR is high, the MCS level may also be high in general. Thus, the PTRS power boosting level may be determined based on SNR level as described above.

Next, when the MCS level is equal to or lower than a predetermined value [S2220], the number of PTRSs in the frequency domain can be determined based on the PRB size, and the PTRS power boosting can be on [S2230]. On the other hand, when the MCS level is higher than the predetermined value [S2220], the number of PTRSs in the frequency domain can be determined based on the PRB size, and the PTRS power boosting can be on [S2240]. In this case, as described above with reference to FIGS. 1 to 21, when the MCS level is equal to or lower than the predetermined value, the PTRS may be transmitted through the PTRS power boosting without increase in the number of PTRSs in the frequency domain. By doing so, the number of PTRSs does not increase, and thus it is possible to reduce performance degradation caused by reference signal overhead. Meanwhile, since CPE and CFO estimation performance can also be improved through the PTRS power boosting, the performance degradation can be further reduced. In addition, for example, the predetermined MCS level value may be 16QAM. However, this is merely an example, and the invention is not limited to the above-described embodiment.

Moreover, when the MCS level is higher than the predetermined value, the PTRS power boosting can be off without increase in the number of PTRSs in the frequency domain. As described above, high MCS level may correspond to a high SNR. In this case, since a certain degree of CPE and CFO estimation performance can be guaranteed due to the high SNR, it is not necessary to perform the PTRS power boosting for the PTRSs.

As another example, when the PTRS power boosting is on, different PTRS power boosting level values can be configured. In addition, for example, the PTRS power boosting level value may be determined based on the number of layers as described above.

As a further example, the PTRS power boosting may be always on regardless of the MCS level. In this case, as still another example, it is able to configure different level values for the PTRS power boosting as described above.

Further, although the invention has been described based on downlink transmission performed by the BS with reference to FIGS. 1 to 21, it can be equally applied to uplink transmission. That is, the aforementioned embodiment can be equally applied when a UE generates a PTRS, transmits PTRS power boosting level information for the PTRS to the BS, and then transmits the PTRS to the BS.

Device Configuration

Figure 23:
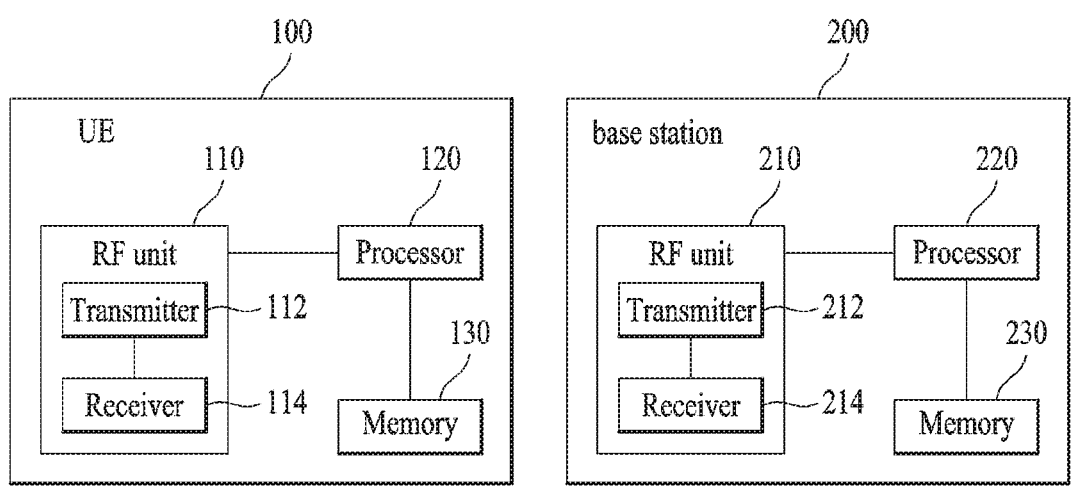
FIG. 23 is a diagram illustrating the configuration of a user equipment and a base station according to an embodiment of the present invention.

FIG. 23 is a diagram illustrating the configuration of a user equipment and a base station according to an embodiment of the present invention. In FIG. 23, the user equipment 100 and the base station 200 may include radio frequency (RF) units 110 and 210, processors 120 and 220 and memories 130 and 230, respectively. Although FIG. 23 shows a 1:1 communication environment between the user equipment 100 and base station 200, a communication environment may be established between a plurality of user equipments and a base station. In addition, the configuration of the base station 200 shown in FIG. 23 can be applied to a macro cell base station and a small cell base station.

The RF units 110 and 210 may include transmitters 112 and 212 and receivers 114 and 214, respectively. The transmitter 112 and the receiver 114 of the user equipment 100 are configured to transmit and receive signals to and from the base station 200 and other user equipments, and the processor 120 is functionally connected to the transmitter 112 and the receiver 114 to control processes performed at the transmitter 112 and the receiver 114 for transmitting and receiving signals to and from other devices. The processor 120 processes a signal to be transmitted, sends the processed signal to the transmitter 112, and processes a signal received by the receiver 114.

If necessary, the processor 120 may store information included in an exchanged message in the memory 130. Due to this structure, the user equipment 100 can perform the methods described in various embodiments of the present invention.

The transmitter 212 and the receiver 214 of the base station 200 are configured to transmit and receive signals to and from another base station and user equipments, and the processor 220 is functionally connected to the transmitter 212 and the receiver 214 to control processes performed at the transmitter 212 and the receiver 214 for transmitting and receiving signals to and from other devices. The processor 220 processes a signal to be transmitted, sends the processed signal to the transmitter 212, and processes a signal received by the receiver 214. If necessary, the processor 220 may store information included in an exchanged message in the memory 230. Due to this structure, the base station 200 can perform the methods described in various embodiments of the present invention.

The processors 120 and 220 of the user equipment 100 and the base station 200 instruct (for example, control, adjust, or manage) operation of the user equipment 100 and the base station 200, respectively. The processors 120 and 220 may be connected to the memories 130 and 230 for storing program code and data, respectively. The memories 130 and 230 are respectively connected to the processors 120 and 220 so as to store operating systems, applications and general files.

Each of the processors 120 and 220 of the present invention may be called a controller, a microcontroller, a microprocessor, a microcomputer, etc. Each of the processors 120 and 220 may be implemented by hardware, firmware, software, or any combination thereof.

When the embodiments of the present invention are implemented by hardware, application specific integrated circuits (ASICs), digital signal processors (DSPs), digital signal processing devices (DSPDs), programmable logic devices (PLDs), field programmable gate arrays (FPGAs), and the like may be included in the processors 120 and 220.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein. In addition, although the present invention has been described with reference to the preferred embodiments thereof, it will be apparent to those skilled in the art that not only the invention is not limited to the aforementioned specific embodiments but various modifications can be made in the present invention without departing from the spirit or scope of the invention. Such modifications are not to be construed individually from the technical spirit and scope of the present invention.

In addition, both an apparatus invention and a method invention are explained in the present specification, and if necessary, the explanation on both the inventions can be complementally applied.

INDUSTRIAL APPLICABILITY

The above-described method can be applied to not only the 3GPP system but also various wireless communication systems including an IEEE 802.16x system and an IEEE 802.11x system. Further, the proposed method can also be applied to an mmWave communication system using ultra high frequency band.

What is claimed is:

1. A method for performing, by a user equipment (UE) in a wireless communication system, the method comprising:
receiving a phase tracking reference signal (PTRS) from a base station (BS); and
performing phase tracking operation based on the PTRS,
wherein a PTRS power boosting level of the PTRS is determined based on a number of Physical Downlink Shared Channel (PDSCH) layers associated with the PTRS.

2. The method of claim 1, further comprising:
receiving PTRS power boosting information indicating a power boosting on/off state of the PTRS.

3. The method of claim 2, wherein the PTRS power boosting information is received via radio resource control (RRC) signaling.

4. The method of claim 1, wherein when the number of PDSCH layers is L, the PTRS power boosting level satisfies $10*\log_2(L)$.

5. The method of claim 1, wherein the number of PDSCH layers corresponds to a number of Demodulation Reference Signal (DMRS) ports associated with the PTRS.

6. The method of claim 1, wherein the PTRS power boosting level is related to an energy per resource element (EPRE) ratio between the PTRS and a corresponding PDSCH.

7. A user equipment (UE), the UE comprising:
a receiver;
a transmitter; and
a processor configured to control the receiver and the transmitter,
wherein the processor is configured to:
receive, through the receiver, a phase tracking reference signal (PTRS) from a base station (BS); and
perform phase tracking operation based on the PTRS,
wherein a PTRS power boosting level of the PTRS is determined based on a number of Physical Downlink Shared Channel (PDSCH) layers associated with the PTRS.

8. The UE of claim 7, wherein the processor is further configured to receive, through the receiver, PTRS power boosting information indicating a power boosting on/off state of the PTRS.

9. The UE of claim 8, wherein the PTRS power boosting information is received via through radio resource control (RRC) signaling.

10. The UE of claim 7, wherein when the number of PDSCH layers is L, the PTRS power boosting level satisfies $10*\log_2(L)$.

11. The UE of claim 7, wherein the number of PDSCH layers corresponds to a number of Demodulation Reference Signal (DMRS) ports associated with the PTRS.

12. The UE of claim 7, wherein the PTRS power boosting level is related to an energy per resource element (EPRE) ratio between the PTRS and a corresponding PDSCH.

13. A non-transitory processor readable medium recorded thereon a program code for executing the method of claim 1.

* * * * *